United States Patent
Saruwatari et al.

(10) Patent No.: US 7,244,528 B2
(45) Date of Patent: Jul. 17, 2007

(54) ALUMINUM NEGATIVE ELECTRODE BATTERY

(75) Inventors: Hidesato Saruwatari, Kawasaki (JP); Haruchika Ishii, Kawasaki (JP); Takahiro Hirai, Yokohama (JP); Norio Takami, Yokohama (JP); Mitsuo Kasori, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 362 days.

(21) Appl. No.: 10/387,483

(22) Filed: Mar. 14, 2003

(65) Prior Publication Data
US 2003/0219650 A1    Nov. 27, 2003

(30) Foreign Application Priority Data
Mar. 15, 2002  (JP)  ............... 2002-072799
Dec. 27, 2002  (JP)  ............... 2002-381378

(51) Int. Cl.
*H01M 4/46*    (2006.01)
*H01M 2/12*    (2006.01)

(52) U.S. Cl. .............. 429/218.1; 429/53; 429/86

(58) Field of Classification Search ............ None
See application file for complete search history.

(56) References Cited

U.S. PATENT DOCUMENTS 2,838,591 A     6/1958  Stokes
3,022,365 A  *  2/1962  Saurwein ............ 429/52
4,605,604 A  *  8/1986  Pollack et al. ........ 429/116
2001/0028979 A1* 10/2001  Takami ............. 429/218.1
2002/0018935 A1*  2/2002  Okada ............. 429/231.95

FOREIGN PATENT DOCUMENTS

| JP | 3-284335 | 12/1991 |
| JP | 8-77996 | 3/1996 |
| JP | 08077996 A * | 3/1996 |
| JP | 2000-113871 | 4/2000 |
| JP | 2001-319662 | 11/2001 |

* cited by examiner

*Primary Examiner*—Patrick Joseph Ryan
*Assistant Examiner*—Robert Hodge
(74) *Attorney, Agent, or Firm*—Oblon, Spivak, McClelland, Maier & Neustadt, P.C.

(57) ABSTRACT

Disclosed is an aluminum negative electrode battery comprising a closed space provided by at least one member including a hydrogen gas permeating member that contains an organic material having a He gas permeability of $2\times10^{-10}$ ($cm^3$(STP)cm/sec·$cm^2$·cmHg) or more at 30° C., and a power generating element including an electrolyte, a positive electrode and a negative electrode containing at least one of aluminum and aluminum alloy, and the power generating element provided in the closed space.

18 Claims, 9 Drawing Sheets

ALUMINUM NEGATIVE ELECTRODE BATTERY

CROSS-REFERENCE TO RELATED APPLICATIONS

This application is based upon and claims the benefit of priority from the prior Japanese Patent Applications No. 2002-072799, filed Mar. 15, 2002; and No. 2002-381378, filed Dec. 27, 2002, the entire contents of both of which are incorporated herein by reference.

BACKGROUND OF THE INVENTION

1. Field of the Invention

The present invention relates to an aluminum negative electrode battery comprising at least one of aluminum and aluminum alloy as a negative electrode active material.

2. Description of the Related Art

At present, manganese batteries and alkaline batteries are used widely in portable appliances. Manganese batteries and alkaline batteries comprise negative electrodes made of zinc and positive electrodes made of manganese dioxide, and have an electromotive force of 1.5 V. As portable appliances are advanced recently, primary batteries and secondary batteries having high voltage, large capacity and light weight are being demanded.

So far, various battery systems have been proposed, and it has been attempted to develop batteries of higher voltage, larger capacity, and lighter weight, but most of batteries are not developed as commercial products owing to lack of reliability.

Most important problems relating to reliability are liquid leak and heat generation.

For example, the primary battery using aluminum as negative electrode is expected to have higher voltage, larger capacity, and lighter weight as compared with the primary battery using zinc as negative electrode, and has been well researched. For example, U.S. Pat. No. 2,838,591 discloses a battery comprising a positive electrode made of manganese dioxide, a negative electrode made of aluminum, and an electrolyte made of weak acidic aqueous solution of aluminum chloride. This battery, however, has a problem in reactivity between the aluminum used as the negative electrode and the electrolyte, and is hence large in self-discharge, large in generation of hydrogen gas, and small in capacity.

More recently, a highly practical aluminum negative electrode battery has been proposed, for example, in Jpn. Pat. Appln. KOKAI Publication No. 2001-319662. In this aluminum negative electrode battery, however, even if there is no factor inducing generation of hydrogen gas such as external short-circuit or abnormal high temperature, the negative electrode and electrolyte react with each other usually to generate a large volume of hydrogen gas, and a large discharge capacity cannot be obtained. Aside from generation of a large amount of gas during discharge, leaks may occur due to the osmotic pressure phenomenon, due to dissolution of discharge products of the negative electrode into the electrolyte, thus it is far from commercial production.

On the other hand, Jpn. Pat. Appln. KOKAI Publication No. 8-77996 proposes preventing leakage or scattering of an electrolyte of the battery, while releasing the gas in the battery to the exterior, by arranging a water repellent polymer film having gas permeability but preventing permeation of liquid between the gasket and the negative electrode bottom plate.

However, a large discharge capacity could not be obtained in the battery disclosed in Jpn. Pat. Appln. KOKAI Publication No. 8-77996.

On the other hand, claim 1 in Jpn. Pat. Appln. KOKAI Publication No. 2000-113871 discloses an alkaline secondary battery having a separator formed from a nonwoven fabric of hydrophilic polyolefin synthetic resin fiber with a contact angle to pure water of 0° to 100°. The definition of the contact angle is defined in paragraph [0015]. That is, a nonwoven fabric of about 2.5×10 cm is placed horizontally, about 10 µL of pure water is dropped on the nonwoven fabric, the fabric is left for 1 minute, and pure water is absorbed in pores of the nonwoven fabric. The contact angle of water drops on the nonwoven fabric surface is measured by an optical microscope such as goniometer type contact angle measuring instrument, and the obtained measurement is the contact angle to pure water. As described in this paragraph [0015], "the nonwoven fabric has an excellent hydrophilic property when the contact angle is small, which means that the nonwoven fabric itself is excellent in the holding performance of electrolyte, and when this value is larger, to the contrary, the nonwoven fabric shows a water repellent property, which means that the holding performance of electrolyte is poor. The contact angle of the nonwoven fabric of polyolefin synthetic resin fiber without hydrophilic treatment is about 120 to 130°."

SUMMARY OF THE INVENTION

It is hence an object of the invention to present an aluminum negative electrode battery having a large discharge capacity.

It is also an object of the invention to present an aluminum negative electrode battery having the liquid leakage rate reduced.

According to a first aspect of the present invention, there is provided an aluminum negative electrode battery comprising:

a closed space provided by at least one member including a hydrogen gas permeating member that contains an organic material having a He gas permeability of $2\times10^{-10}(cm^3(STP)$ cm/sec·cm$^2$·cmHg) or more at 30° C.; and a power generating element including an electrolyte, a positive electrode and a negative electrode containing at least one of aluminum and aluminum alloy, and the power generating element provided in the closed space.

According to a second aspect of the present invention, there is provided an aluminum negative electrode battery comprising:

a tubular outer casing;

a bottom plate having a negative electrode terminal and provided in an opening of the outer casing;

a negative electrode current collector rod electrically connected to the bottom plate;

a negative electrode gasket provided between an inner wall of the outer casing and the negative electrode current collector rod and containing a hydrogen gas permeable organic material that has a He gas permeability of $2\times10^{-10}$ $(cm^3(STP)cm/sec·cm^2·cmHg)$ or more at 30° C.;

a bag-shaped separator surrounding the negative electrode current collector rod;

a negative electrode gel filled into the bag-shaped separator and containing at least one of aluminum and aluminum alloy; and a positive electrode provided between the separator and the outer casing.

According to a third aspect of the present invention, there is provided an aluminum negative electrode battery which comprises a power generating element provided in a space formed by crimping and fixing one electrode container to the other electrode container with an insulating gasket interposed between the one electrode container and the other electrode container, wherein the one electrode container or the other electrode container is made of a material containing at least one of aluminum and aluminum alloy, and the insulating gasket contains a hydrogen gas permeable organic material having a He gas permeability of $2 \times 10^{-10}$ ($cm^3$(STP)cm/sec·$cm^2$·cmHg) or more at 30° C.

According to a fourth aspect of the present invention, there is provided an aluminum negative electrode battery comprising:

a tubular outer casing;

a sealing plate having a positive electrode terminal, and provided in an opening of the outer casing;

a negative electrode case made of a material containing at least one of aluminum and aluminum alloy, and provided in the outer casing;

an insulating washer provided in an opening of the negative electrode case, and containing a hydrogen gas permeable organic material that has a He gas permeability of $2 \times 10^{-10}$ ($cm^3$(STP)cm/sec·$cm^2$·cmHg) or more at 30° C.; and a positive electrode current collector rod inserted into an opening of the insulating washer such that its end electrically connects to the sealing plate.

According to a fifth aspect of the present invention, there is provided an aluminum negative electrode battery comprising:

a battery case;

a power generating element including an aqueous electrolyte and provided in the battery case; and a hydrogen gas permeable sheet provided in an opening of the battery case, and having a water repellence of 2 kPa or more and a He gas permeability in a range of $2 \times 10^{-6}$ to $10000 \times 10^{-6}$ ($cm^3$(STP)cm/sec·$cm^2$·cmHg) at 30° C.

According to a sixth aspect of the present invention, there is provided an aluminum negative electrode battery comprising:

a power generating element case;

a cylindrical positive electrode mixture provided in the power generating element case;

a bag-shaped separator provided in a hollow space of the positive electrode mixture;

a negative electrode gel contained in the separator, and containing an aqueous electrolyte and a negative electrode active material containing at least one of aluminum and aluminum alloy; and a hydrogen gas permeable sheet provided in an opening of the power generating element case so as to face at least part of the negative electrode gel, the separator and the positive electrode mixture, wherein the hydrogen gas permeable sheet has a water repellence of 2 kPa or more and a He gas permeability of a range of $2 \times 10^{-6}$ to $10000 \times 10^{-6}$ ($cm^3$(STP)cm/sec·$cm^2$·cmHg) at 30° C.

According to a seventh aspect of the present invention, there is provided an aluminum negative electrode battery comprising:

a negative electrode case formed of a material containing at least one of aluminum and aluminum alloy;

a positive electrode mixture provided in the negative electrode case;

a separator provided between an inner wall of the negative electrode case and the positive electrode mixture;

an aqueous electrolyte provided in the negative electrode case; and a hydrogen gas permeable sheet provided in an opening of the negative electrode case so as to face the separator and at least part of the positive electrode mixture, wherein the hydrogen gas permeable sheet has a water repellence of 2 kPa or more and a He gas permeability in a range of $2 \times 10^{-6}$ to $10000 \times 10^{-6}$ ($cm^3$(STP)cm/sec·$cm^2$·cmHg) at 30° C.

According to an eighth aspect of the present invention, there is provided an aluminum negative electrode battery comprising:

a battery case;

a power generating element including an aqueous electrolyte and provided in the battery case; and a water repellent member which permeates hydrogen gas and is provided in an opening of the battery case, wherein the water repellent member includes at least one hydrogen gas permeable sheet having a water repellence of 2 kPa or more and a He gas permeability in a range of $2 \times 10^{-6}$ to $10000 \times 10^{-6}$ ($cm^3$(STP)cm/sec·$cm^2$·cmHg) at 30° C.

According to a ninth aspect of the present invention, there is provided an aluminum negative electrode battery comprising:

a power generating element case;

a positive electrode mixture provided in the power generating element case;

a negative electrode gel which is provided in the power generating element case, and contains an aqueous electrolyte and an active material containing at least one of aluminum and aluminum alloy;

a separator provided between the positive electrode mixture and the negative electrode gel; and a water repellent member which permeates hydrogen gas, and is provided in an opening of the power generating element case so as to face at least one part of the negative electrode gel, the separator and the positive electrode mixture, wherein the water repellent member comprises at least one hydrogen gas permeable sheet having a water repellence of 2 kPa or more and a He gas permeability in a range of $2 \times 10^{-6}$ to $10000 \times 10^{-6}$ ($cm^3$(STP) cm/sec·$cm^2$·cmHg) at 30° C.

According to a tenth aspect of the present invention, there is provided an aluminum negative electrode battery comprising:

a negative electrode case formed of a material containing at least one of aluminum and aluminum alloy;

a power generating element which is provided in the negative electrode case, and includes a positive electrode mixture, an aqueous electrolyte and a separator provided between an inner surface of the negative electrode case and the positive electrode mixture; and a water repellent member which permeates hydrogen gas, and is provided in an opening of the negative battery case, wherein the water repellent member comprises at least one hydrogen gas permeable sheet having a water repellence of 2 kPa or more and a He gas permeability in a range of $2 \times 10^{-6}$ to $10000 \times 10^{-6}$ ($cm^3$(STP)cm/sec·$cm^2$·cmHg) at 30° C.

According to an eleventh aspect of the present invention, there is provided an aluminum negative electrode battery comprising:

a negative electrode including an active material containing at least one of aluminum and aluminum alloy;

a positive electrode;

a separator which is provided between the negative electrode and the positive electrode, and has a first hydrophobic surface facing the negative electrode and a second hydrophobic surface facing the positive electrode; and an aqueous electrolyte.

DETAILED DESCRIPTION OF THE INVENTION

An aluminum negative electrode battery of the present invention comprises a power generating element which includes an electrolyte, a positive electrode and a negative electrode containing at least one of aluminum and aluminum alloy, and is accommodated in a closed space, wherein a part of members composing the closed space is formed of a hydrogen gas permeating material containing an organic material of which He gas permeability is $2 \times 10^{-10}$ $(cm^3(STP)cm/sec \cdot cm^2 \cdot cmHg)$ or more at 30° C.

Specific examples of the aluminum negative electrode battery of the invention include the following first to third aluminum negative electrode batteries.

A first aluminum negative electrode battery according to the invention comprises:

a cylindrical outer casing;

a sealing plate having a positive electrode terminal, and arranged at an upper side opening of the outer casing;

a bottom plate having a negative electrode terminal, and arranged at a lower side opening of the outer casing;

a negative electrode current collector rod electrically connected to the bottom plate;

a negative electrode gasket arranged between an inner wall of the outer casing and the negative electrode current collector rod, containing a hydrogen gas permeable organic material of which He gas permeability is $2 \times 10^{-10}$ $(cm^3(STP)$ $cm/sec \cdot cm^2 \cdot cmHg)$ or more at 30° C.;

a bag-shaped separator arranged so as to surround the negative electrode current collector rod;

a negative electrode gel filled into the bag-shaped separator and containing at least one of aluminum and aluminum alloy; and a positive electrode arranged between the separator and the outer casing.

Figure 1:
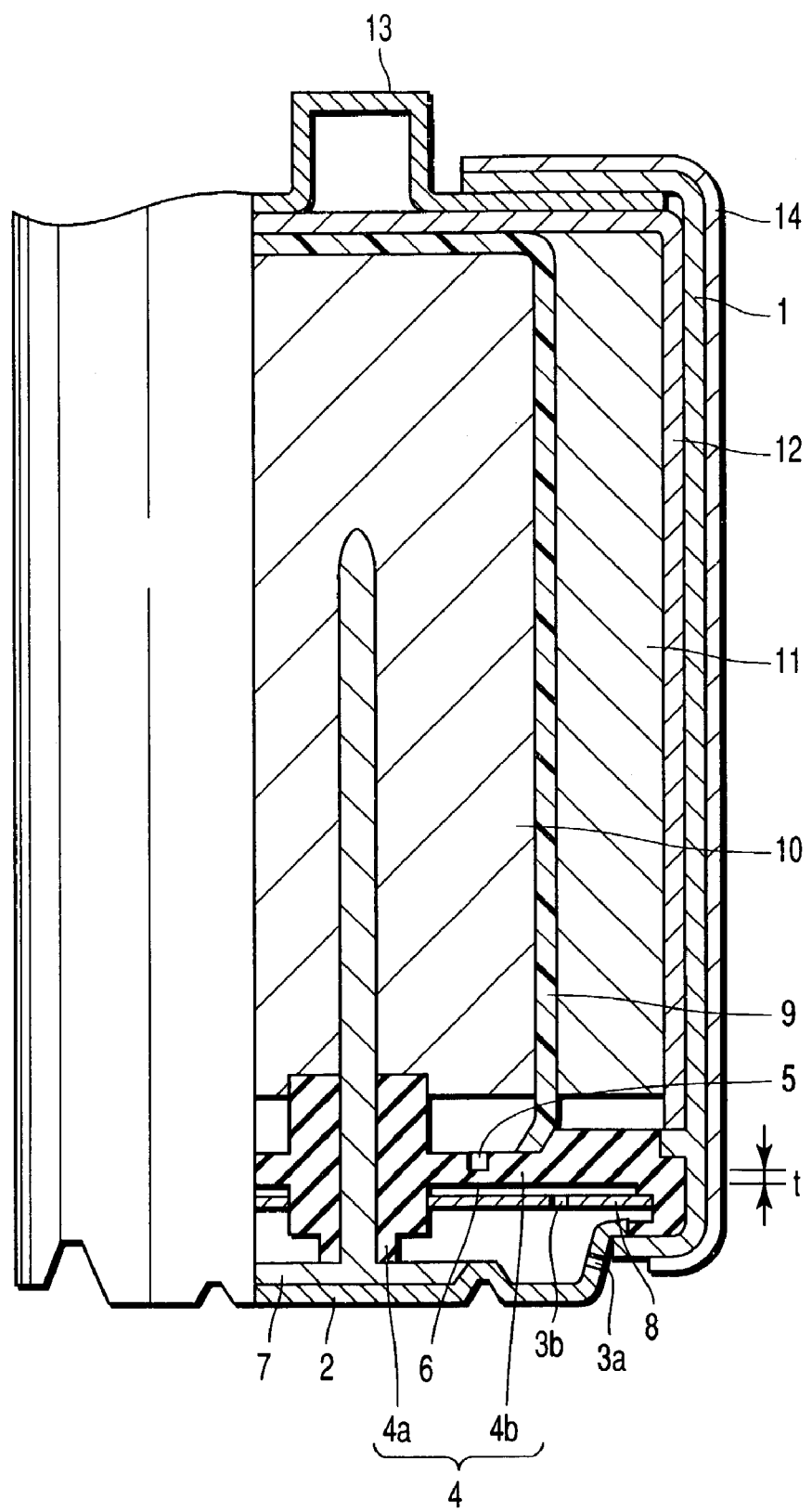
FIG. 1 is a partial sectional view of an aluminum negative electrode battery of an alkaline dry cell structure as an example of a first aluminum negative electrode battery of the invention.

An example of the first aluminum negative electrode battery of the invention will be explained below by referring to FIG. 1 and FIG. 2. FIG. 1 is a partial sectional view showing an aluminum negative electrode battery of an alkaline dry cell structure as an example of the first aluminum negative electrode battery of the invention, and FIG. 2 is a magnified sectional view of the aluminum negative electrode battery of FIG. 1.

Figure 2:
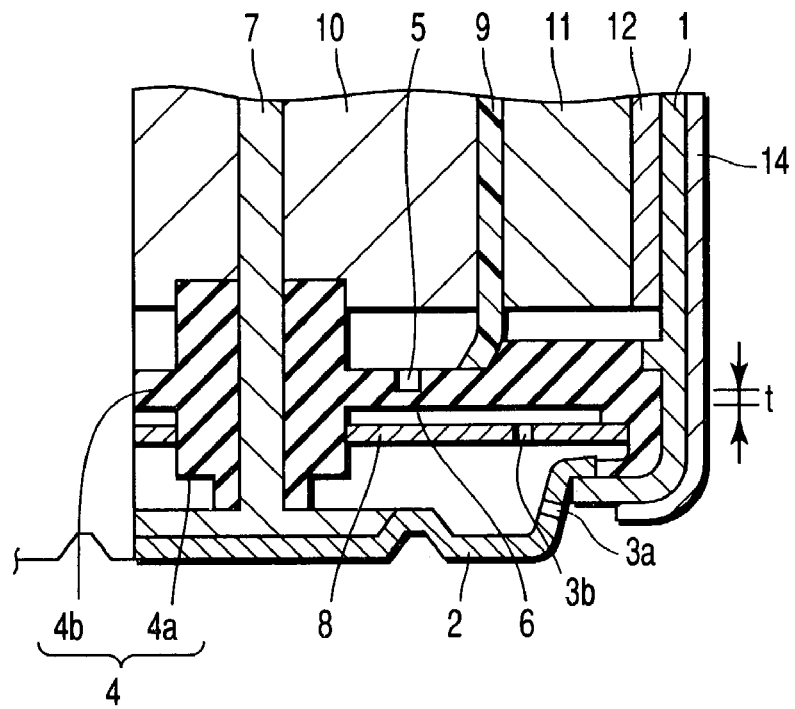
FIG. 2 is an enlarged sectional view showing main potions of the aluminum negative electrode battery of FIG. 1.

As shown in FIG. 1 and FIG. 2, a cylindrical outer casing 1 is made of material containing resin forming the inner surface. An opening lower end of the outer casing 1 is folded inward, and the folded portion is adhered to a peripheral edge of a bottom plate 2 serving also as a negative electrode terminal, by an adhesive insulating material (such as tar or pitch). A gas vent 3a is made in the bottom plate 2.

A negative electrode gasket 4 has a tubular support 4a and a flange 4b formed around the support 4a. The negative electrode gasket 4 is inserted into the outer casing 1 with the peripheral edge of the flange 4b folded downward. The negative electrode gasket 4 contains a hydrogen gas permeable organic material of which He gas permeability is $2 \times 10^{-10}$ $(cm^3(STP)cm/sec \cdot cm^2 \cdot cmHg)$ or more at 30° C. The flange 4b of the negative electrode gasket 4 has a thinnest portion 6 formed by processing a circular groove 5. The thickness t of the thinnest portion 6 is preferably in a range of 5 to 300 μm.

A negative electrode current collector rod 7 is inserted into the support 4a of the negative electrode gasket 4, and its lower end is welded to the inside of the bottom plate 2. A metal washer 8 is inserted between the support 4a and the folded portion of the flange 4b of the negative electrode gasket 4. By the impact resilience applied to the negative electrode gasket 4 by the metal washer 8, the contact tightness of the outer casing 1, negative electrode gasket 4, and negative electrode current collector rod 7 is enhanced, and the tightness of closing is assured. A gas vent 3b is formed in part of the metal washer 8.

A separator 9 of a cylindrical form with a bottom is arranged on the negative electrode gasket 4 so as to surround the negative electrode current collector rod 7. A negative electrode gel 10 fills up the space surrounded by the separator 9 and the negative electrode gasket 4. A cylindrical positive electrode mixture 11 is arranged between the side periphery of the separator 9 and the inner wall of the outer casing 1. A positive electrode can 12 of a cylindrical form with a bottom covers the top of the separator 9, the top of the positive electrode mixture 11, and the side periphery of the positive electrode mixture 11. An electrolyte is held in the negative electrode gel 10, separator 9 and positive electrode mixture 11. A sealing plate (positive electrode terminal plate) 13 of a cap shape serving also as positive electrode terminal is arranged on the top of the positive electrode can 12. The opening upper end of the outer casing 1 is folded inward, and the inside of the folded portion is adhered to the periphery of the sealing plate 13 by an adhesive insulating material (for example, tar or pitch). An outer tube 14 of, for example, metal foil covers the outer casing 1.

In the aluminum negative electrode battery having such a configuration, the power generating element including the negative electrode current collector rod 7, negative electrode gel 10, separator 9, and positive electrode mixture 11 are accommodated in a closed space formed by the outer casing 1, bottom plate 2, negative electrode gasket 4, and sealing plate 13. The negative electrode gasket 4, which is one of the constituent members composing the closed space and is a hydrogen gas permeating member, contains a hydrogen gas permeable organic material of which He gas permeability is $2 \times 10^{-10}$ (cm$^3$(STP)cm/sec·cm$^2$·cmHg) or more at 30° C.

In this aluminum negative electrode battery, hydrogen gas is always generated during use by reaction between Al in the negative electrode gel 10 and the electrolyte. However, the generated hydrogen gas passes through the negative electrode gasket 4, gas vent 3b in the metal washer 8, extremely small gaps existing between the bottom plate 2 and the outer casing 1, and gas vent 3a in the bottom plate 2, and is gradually released to the outside. As a result, the electrolyte is not deplered and elevation of internal pressure during discharge can be suppressed, so that the discharge capacity can be enhanced.

Incidentally, if exposed to external short-circuit or abnormal high temperature due to misuse or the like, suddenly elevating the internal pressure by generation of gas mainly composed of hydrogen gas, the thinnest portion 6 of the negative electrode gasket 4 is broken. This gas passes through the broken point, gas vent 3b in the metal washer 8, and the gas vent 3a in the bottom plate 2, and is released outside, so that rupture can be prevented.

A second aluminum negative electrode battery according to the invention comprises a power generating element accommodated in a closed space provided by crimping and fixing one electrode container to the other electrode container with an insulating gasket interposed between the one electrode container and the other electrode container, wherein the one electrode container or the other electrode container is made of aluminum or aluminum alloy, and the insulating gasket contains a hydrogen gas permeable organic material of which He gas permeability is $2 \times 10^{-10}$ (cm$^3$(STP)cm/sec·cm$^2$·cmHg) or more at 30° C.

Figure 3:
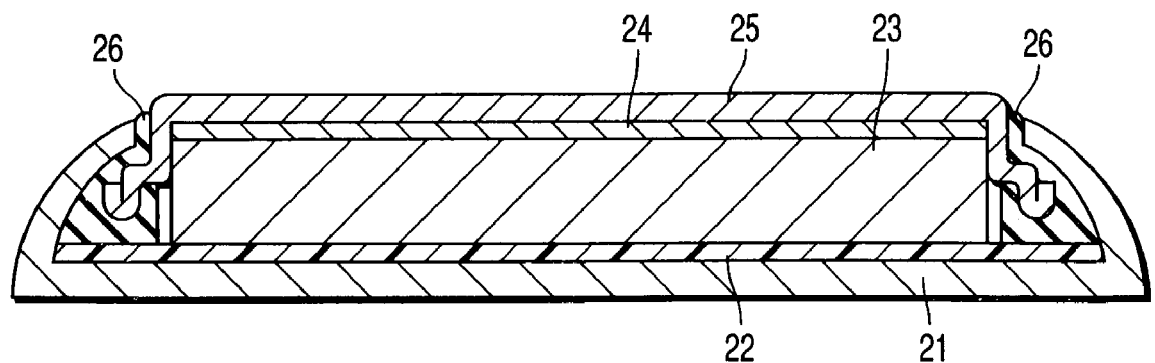
FIG. 3 is a sectional view of a coin type aluminum negative electrode battery as an example of a second aluminum electrode battery of the invention.

An example of the second aluminum negative electrode battery of the invention is explained by referring to FIG. 3. FIG. 3 is a partial sectional view of a coin type aluminum negative electrode battery as an example of the second aluminum negative electrode battery of the invention. Incidentally, the second aluminum negative electrode battery can be a button type aluminum negative electrode battery.

As shown in FIG. 3, a negative electrode container 21 of a cylindrical form with a bottom made of aluminum or aluminum alloy serves also a negative electrode. A separator 22 is arranged on the inner surface of the bottom of the negative electrode container 21. A positive electrode mixture 23 of pellets is arranged on the separator 22. A positive electrode current collector 24 is arranged on the positive electrode mixture 23. An electrolyte is impregnated at least in the positive electrode mixture 23 and separator 22. A positive electrode container 25 of a cylindrical shape with a bottom serving also as a positive electrode terminal (made of, for example, molybdenum, tungsten, lead, titanium nitride, or other metal) is crimped and fixed to the negative electrode container 21 by way of a ring-shaped insulating gasket 26. The insulating gasket 26 contains a hydrogen gas permeable organic material of which He gas permeability is $2 \times 10^{-10}$ (cm$^3$(STP)cm/sec·cm$^2$·cmHg) or more at 30° C.

In the coin type aluminum negative electrode battery shown in FIG. 3, the power generating element including the separator 22, and positive electrode mixture 23, positive electrode current collector 24 and electrolyte are accommodated in a closed space formed by crimping and fixing the positive electrode container 25 to the negative electrode container 21 with the insulating gasket 26 interposed between the positive electrode container 25 and the negative electrode container 21. The insulating gasket 26, which is one of constituent members composing the closed space and is a hydrogen gas permeating member, contains a hydrogen gas permeable organic material of which He gas permeability is $2 \times 10^{-10}$ (cm$^3$(STP)cm/sec·cm$^2$·cmHg) or more at 30° C.

In this aluminum negative electrode battery, hydrogen gas is always generated during use by the reaction between Al in the negative electrode container 21 and the electrolyte. However, the generated hydrogen gas passes through the insulating gasket 26 and is released outside, or passes through the insulating gasket 26 and extremely small gaps existing between the insulating gasket 26 and the negative electrode container 21 or positive electrode container 25, and is gradually released outside. As a result, the electrolyte is not depleted and elevation of internal pressure due to progress of discharge can be suppressed, so that the discharge capacity can be enhanced.

A third aluminum negative electrode battery of the invention comprises:

a cylindrical outer casing;

a sealing plate having a positive electrode terminal, and arranged in an opening of the outer casing;

a negative electrode case made of aluminum or aluminum alloy, and provided in the outer casing;

an insulating washer fixed in an opening of the negative electrode case, and containing a hydrogen gas permeable organic material of which He gas permeability is $2 \times 10^{-10}$ (cm$^3$(STP)cm/sec·cm$^2$·cmHg) or more at 30° C.; and a positive electrode current collector rod inserted into an opening of the insulating washer such that its upper end electrically connects to the sealing plate.

Figure 4:
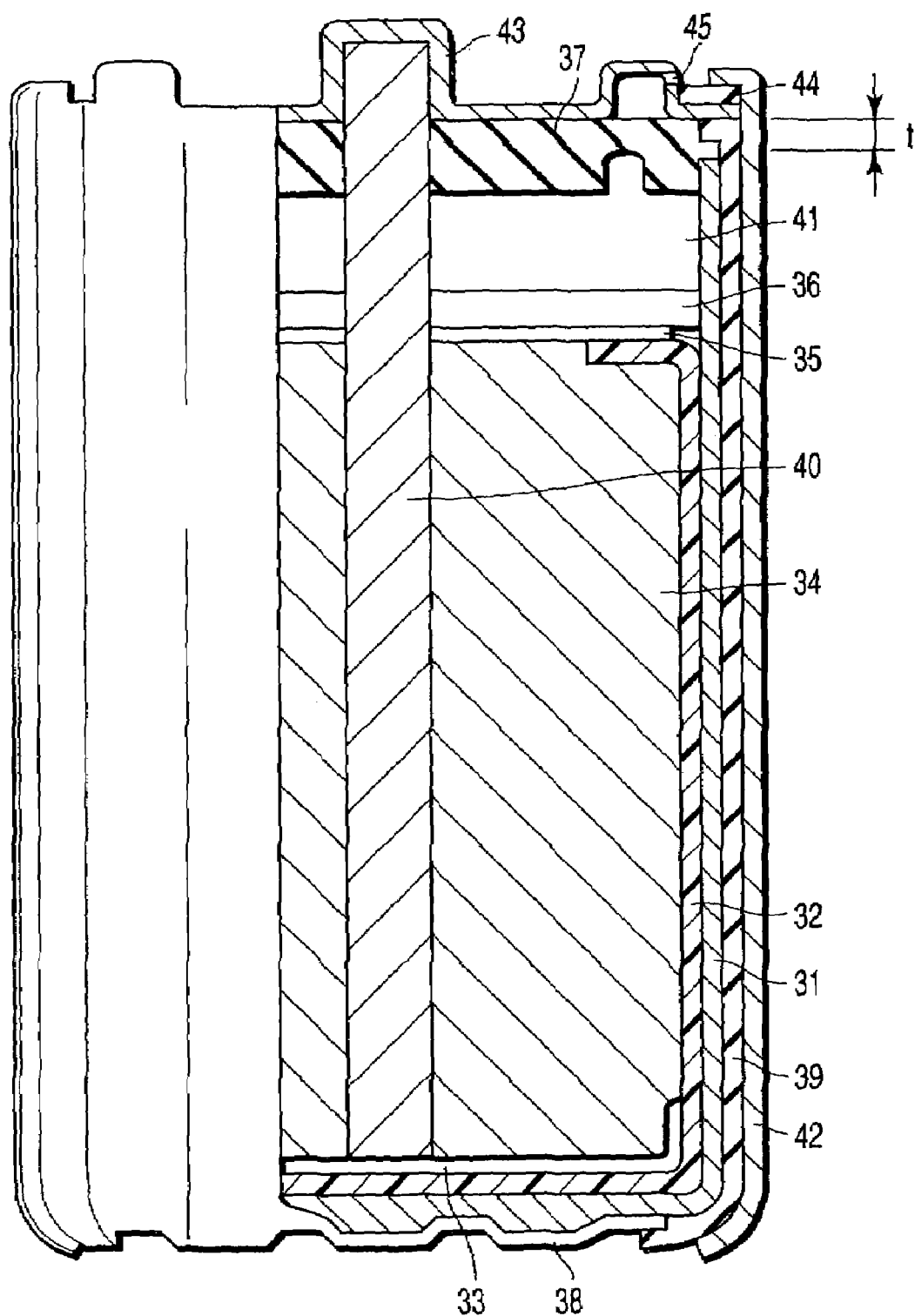
FIG. 4 is a partial sectional view showing an aluminum negative electrode battery of a manganese dry cell structure as an example of a third aluminum negative electrode battery of the invention.

An example of the third aluminum negative electrode battery of the invention is explained below by referring to FIG. 4. FIG. 4 is a partial sectional view of aluminum negative electrode battery of a manganese dry cell structure as an example of the third aluminum negative electrode battery of the invention.

As shown in FIG. 4, a negative electrode can 31 of cylindrical shape with a bottom is made of aluminum or aluminum alloy. A separator 32 is provided on the inner wall of the negative electrode can 31. A bottom paper 33 is provided on the separator 32. The negative electrode can 31 is filled with a positive electrode mixture 34 containing positive electrode active material, conductive agent, and electrolyte. A brim paper 35 is arranged on the positive electrode mixture 34. A wax layer 36 is arranged on the brim paper 35.

An insulating washer 37 contains a hydrogen gas permeable organic material of which He gas permeability is $2 \times 10^{-10}$ (cm$^3$(STP)cm/sec·cm$^2$·cmHg) or more at 30° C. A thinnest portion is formed by cutting off part of the insulating washer 37. The thickness t of the thinnest portion is preferably in a range of 5 to 300 µm.

The insulating washer 37 is placed on the opening upper end of the negative electrode case (for example, negative electrode can) 31, and a negative electrode terminal plate 38 is arranged in the bottom of the negative electrode can 31. A heat shrink tube 39 covers the circumference of the negative electrode can 31, fixes the insulating washer 37 to the negative electrode can 31 and also fixed the negative electrode terminal 38 to the negative electrode can 31.

A positive electrode current collector rod 40 is inserted in the opening of the brim paper 35, wax layer 36 and insulating washer 37, and its upper end projects from the insulating washer 37. The space between the wax layer 36 and the insulating washer 37 functions as an air chamber 41.

A tubular outer casing 42 covers the heat shrink tube 39. A cap-shaped sealing plate (positive electrode terminal plate) 43 serving also as a positive electrode terminal is arranged in an upper opening of the outer casing 42 so as to cover the upper end of the positive electrode current collector rod 40. A gas vent 45 is formed in part of the sealing plate 43. An insulating ring 44 is interposed between the outer casing 42 and the sealing plate 43.

In the aluminum negative electrode battery having such a configuration as shown in FIG. 4, the power generating element including the separator 32, positive electrode mixture 34, and positive electrode current collector rod 40 are accommodated in a closed space formed by the negative electrode can 31, insulating washer 37, heat shrink tube 39, outer casing 42, and sealing plate 43. The insulating washer 37, which is a constituent member composing the closed space and is a hydrogen gas permeating member, contains a hydrogen gas permeable organic material of which He gas permeability is $2 \times 10^{-10}$ (cm$^3$(STP)cm/sec·cm$^2$·cmHg) or more at 30° C.

In this aluminum negative electrode battery, hydrogen gas is always generated during use, by the reaction between Al in the negative electrode can 31 and the electrolyte. However, the generated hydrogen gas passes through the insulating washer 37, and extremely small gaps existing between the sealing plate 43 and the outer casing 42, and is gradually released outside. As a result, the electrolyte is not depleted and elevation of internal pressure due to progress of discharge can be suppressed, so that the discharge capacity can be enhanced.

In the event of a sudden generation of gas, the thinnest portion of the insulating washer 37 is broken, and the gas is released through the gas vent 45 in the sealing plate 43, so that rupture can be prevented.

The positive electrode, negative electrode, separator, electrolyte, and hydrogen gas permeable organic material used in the first to third aluminum negative electrode batteries of the invention will be described below.

1) Positive Electrode

The positive electrode comprises a current collector, and a positive electrode mixture formed on the surface of the current collector and containing a positive electrode active material and a conductive agent. A binder is added to the positive electrode mixture as required.

Positive electrode active materials include at least one material selected from the group consisting metal oxides, metal sulfides and conductive polymers.

Examples of the metal oxide include manganese dioxide such as $MnO_2$, lead dioxide such as $PbO_2$, nickel hydroxide such as NiOOH and $Ni(OH)_2$, silver oxide such as $Ag_2O$, and iron oxides such as FeO, $Fe_2O_3$, $FeO_x$ (x being x>1.5), $M_xFeO_4$ (M being at least one selected from Li, K, Sr and Ba, and x being $x \geq 1$). Examples of the conductive polymer include polyaniline, polypyrrole, and organic sulfur compounds such as disulfide compound and sulfur. Above all, manganese dioxide is preferred.

Examples of the conductive agent include graphite, acetylene black, and carbon black.

A conductive agent should be contained in the positive electrode mixture, and thereby the electron conductivity between the positive,electrode mixture and current collector can be enhanced. The content of the conductive agent in the positive electrode mixture is preferably to be in a range of 1 to 20 wt. %. That is, if the content of the conductive agent in the positive electrode mixture is less than 1%, the electron conductivity in the positive electrode mixture cannot be enhanced sufficiently. On the other hand, if the content of the conductive agent in the positive electrode mixture is more than 20%, the content of the positive electrode active material is decreased, and an adequate positive electrode reaction cannot be obtained.

The positive electrode mixture is prepared, for example, by mixing positive electrode active material powder and conductive agent, and pressing and forming into pellets. As required, by mixing a binder in the positive electrode mixture, the positive electrode active material can be fixed to the surface of the current collector.

The binder contained in the positive electrode mixture is, for example, polytetrafluoroethylene.

The positive electrode current collector can support the positive electrode mixture, and also enhance the electron conductivity between the positive electrode mixture and the positive electrode terminal.

The positive electrode current collector may be either porous or nonporous.

Materials for forming the positive electrode current collector include, for example, at least one material selected from a group consisting of tungsten (W), molybdenum (Mo), lead (Pb), titanium nitride such as TiN, and conductive materials such as carbonaceous materials. In the positive electrode current collector, tungsten (W), molybdenum (Mo), and lead (Pb) may exist seperately or as an alloy containing at least two selected from tungsten, molybdenum and lead. A positive electrode current collector containing titanium nitride is, for example, a positive electrode current collector consisting essentially of titanium nitride, or one of metal plate, such as nickel plate, the surface of which is coated (plated) with titanium nitride. In particular, at least one metal selected from a group consisting of tungsten (W) and molybdenum (Mo), or a carbonaceous material is preferred.

When the positive electrode current collector contains at least one conductive material selected from the group consisting of tungsten (W), molybdenum (Mo), lead (Pb), and titanium nitride such as TiN, the content of the conductive material in the positive electrode current collector is preferred to be 99 wt. % or more, more preferably 99.9 wt. % or more.

The positive electrode current collector containing a carbonaceous material is prepared, for example, by mixing carbonaceous material powder and binder, and pressing and forming.

The carbonaceous material powder is, for example, graphite powder or carbon fiber.

The content of the carbonaceous material in the positive electrode current collector is preferred to be 80 wt. % or more, more preferably 90 wt. % or more.

This positive electrode may be mixed with an electrolyte described below.

2) Negative Electrode

A negative electrode contains at least one active material selected from the group consisting of aluminum, aluminum alloy, zinc, lead, silver and magnesium. Above all, at least one of aluminum and aluminum alloy are preferred from the viewpoint of capacity per unit weight, and are also large in gas generation during discharge or storage, and therefore by using the hydrogen gas permeable sheet of the invention, the discharge capacity can be improved substantially.

The purity of the negative electrode metal is preferred to be 99 wt. % or more, that is, the impurity should be 1% or less. In the case of aluminum, in particular, the purity should be 99.5 wt. % or more, that is, aluminum with the impurity of 0.5 wt. % or less should be used. If the impurity is contained in more than 0.5 wt. %, corrosion by the electrolyte is likely to occur, and a violent self-discharge or gas generation may take place. The purity is most preferably 99.9 wt. % or more.

An example of aluminum alloy is an alloy of Al with at least one metal selected from a group consisting of Mn, Cr, Sn, Ca, Mg, Pb, Si, In, and Zn. In particular, an alloy of Al with at least one metal selected from a group consisting of Mg, Mn, Zn, Pb, and Cr is preferred. A specific composition of aluminum alloy is, for example, 94.5 wt. % Al-2 wt. % Mg-3.5 wt. % Cr, 95 wt. % Al-5 wt. % Mg, 99.5 wt. % Al-0.3 wt. % Mn-0.2 wt. % Zn, 95 wt. % Al-5 wt. % Pb, or 94.95 wt. % Al-5 wt. % Mn-0.05 wt. % In.

This negative electrode can be preliminarily mixed with an electrolyte described below. That is, a negative electrode gel can be prepared by mixing the negative electrode active material, electrolyte and polymer holding this electrolyte.

The surface of the negative electrode may be coated with an additive explained in item 4) Electrolyte below.

3) Separator

The separator is made of, for example, an insulating material. Preferably, the separator is made of a porous material because the electrolyte is held in the separator and the ion should be migrated in the electrolyte.

The separator is, for example, kraft paper, synthetic resin sheet, natural fiber sheet, nonwoven fabric, glass fiber sheet, or polyolefin porous film.

The thickness of the separator is preferably in a range of 10 to 200 μm. If the thickness of the separator is less than 10 μm, short-circuit may occur between the positive electrode and the negative electrode. On the other hand, if the thickness of the separator is more than 200 μm, the moving distance of the ionized electrolyte is extended, and the ion conductivity may be lowered.

The separator is not always necessary in a battery structure in which the positive electrode and negative electrode are arranged so as not to contact each other, and the electrolyte can be held between the positive electrode and the negative electrode. Alternatively, it can be used a solid electrolyte prepared by adding a thickener to the electrolyte to gelate. In this case, the thickener functions as a separator, and the electrolyte phase is held in the thickener. Herein, the porous sheet can be also used at the same time.

4) Electrolyte

The electrolyte contains a salt and a solvent for dissolving the salt. An additive for suppressing the corrosive reaction between the electrolyte and the negative electrode should be preferably added to this electrolyte. The electrolyte may also contain another additive for the purpose other than suppression of corrosive reaction between the electrolyte and the negative electrode.

(4-1) Electrolyte

An electrolyte is a compound for supplying at least one kind of ion (called a first ion) of a sulfate ion ($SO_4^{2-}$) and nitrate ion ($NO_3^-$) in a solvent. By supplying a highly reactive ion such as sulfate ion ($SO_4^{2-}$) or nitrate ion ($NO_3^-$) in the electrolyte, a higher output is realized in the battery.

The compound supplying the nitrate ion includes at least one compound selected from the group consisting of nitric acid, aluminum nitrate, sodium nitrate, potassium nitrate, ammonium nitrate and lithium nitrate.

The concentration of the first ion in the electrolyte is preferred to be in a range of 0.2 to 16 M/L. If the concentration of the first ion is less than 0.2 M/L, the ion conductivity may be too small. Further, when containing an additive in the electrolyte, it may be hard to form a sufficient film derived from the additive on the negative electrode surface, and the corrosive reaction of the negative electrode may not be suppressed sufficiently. On the other hand, if the concentration of the first ion is more than 16 M/L, the film growth on the negative electrode surface is significant, and the interface resistance of the negative electrode becomes large, and a high voltage may not be obtained. A more preferred range is 0.5 to 10 M/L.

(4-2) Additive

Usable additives include, for example, nitrogen-containing organic compound, organic acid, organic acid salt, organic acid ester, anhydride of organic compound, organic acid ion, and their derivatives. One or more types of additive may be used. The additive is preferred to contain a nitrogen-containing organic compound as an essential component.

The additive exists on the surface of the negative electrode by the functional group of the additive, and is considered to suppress the corrosive reaction between the electrolyte such as $H_2SO_4$ and Al of the negative electrode. Some of the additives are adsorbed on the negative electrode. Others may be adhered to form a film or the like. Or a specific layer may be formed. In addition, some exist near the negative electrode. The performance is exhibited according to each state.

Of the positive electrode reaction and negative electrode reaction in the aluminum negative electrode battery, examples of using manganese dioxide as positive electrode active material are shown in the following formulas (1) and (2).

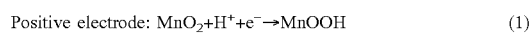

Positive electrode: $MnO_2 + H^+ + e^- \rightarrow MnOOH$ (1)

Negative electrode: $Al + 3H_2O \rightarrow Al(OH)_3 + 3H^+ + 3e^-$ (2)

On the other hand, aside from the battery reaction, for example, when an aqueous solution of sulfuric acid is used as an electrolyte, the aluminum of the negative electrode is likely to corrode (self-discharge) by sulfuric acid by the corrosion reaction shown in the following formula (3). Since the first ion is high in reactivity and is hence high in battery output, the reactivity of the corrosive reaction in the formula (3) is also high.

$$2Al + 3H_2SO_4 \rightarrow Al_2(SO_4)_3 + 3H_2 \quad (3)$$

Additive components existing on the negative electrode surface are low in electron conductivity, and can suppress exchange of electrons between the sulfuric acid contained in the electrolyte and the aluminum of the negative electrode, and therefore it is expected that the corrosive reaction of the negative electrode can be suppressed.

By using the additive, without sacrificing the discharge reaction such as shown in the formulas (1) and (2), the corrosive reaction of the negative electrode shown in the formula (3) can be decreased.

Examples of the nitrogen-containing organic compound include nitrogen-containing heterocyclic organic compound, organic compound containing at least one functional group selected from a group consisting of amino group (—NH$_2$), imino group (=NH), azo group (—N=N—), and azide group (—N$_3$), salt of the organic compound, ester of the organic compound, ion of the organic compound, and their derivatives. One or more types of nitrogen-containing organic compound may be used.

Specific examples are pyridine, pyrazine, triazine, quinoline, acrylidine, acridone, aniline, dipyridyl, pyrrolidine, pyrazole, imidazole, triazole, diphenyl amine, azobenzene, quinaldine, kinin, aminoquinoline, amino imidazole benzoate, oxyindole, benzothiazole, benzotriazole, oxyquinoline, acetamide, 1,10-phenanthroline, 1,10-phenanthronium chloride, bathophenanthroline, imide succinate, aminobenzoic acid, imide maleate, and 2-mercapto-5-methyl benzimidazole.

Examples of the organic acid include an acid containing at least one functional group selected from a group consisting of a carboxylic acid group (COOH), a sulfonic acid group (SO$_3$H), a hydroxyl group (OH), and a nitro group (NO$_2$), salt of the organic acid, ester of the organic acid, ion of the organic acid, and their derivatives. One or more kinds of organic acid may be used.

Specific examples of the organic acid include methyl alcohol, ethyl alcohol, propyl alcohol, butyl alcohol, phenol, glycerin, glycolic acid, ethylene glycol, formic acid, acetic acid, propionic acid, oxalic acid, salicylic acid, sulfosalicylic acid, malic acid, tartaric acid, succinic acid, fumaric acid, phthalic acid, malonic acid, citric acid, maleic acid, lactic acid, butyric acid, pyruvic acid, benzoic acid, sulfobenzoic acid, nitromethane, sulfoaniline, nitrobenzene sulfonyl, polyvinyl alcohol, vinyl acetate, vinyl sulfonate, poly(styrene sulfonic acid), poly(vinyl acetate), methyl acetate, acetic anhydride, maleic anhydride, phthalic anhydride, diethyl malonate, sodium benzoate, sodium sulfobenzoate, sulfoaniline chloride, ethyl chloroacetate, methyl dichloroacetate, poly(vinyl potassium acetate), poly(styrene lithium sulfonate), polyacrylic acid, and lithium polyacrylate. The polymer may be a copolymer containing one kind of the organic acid.

The concentration of the additive in the electrolyte is preferred to be in a range of 0.0001 to 6 M/L. If the concentration of the additive is less than 0.0001 M/L, a satisfactory effect of the additive is not obtained on the negative electrode surface. If the concentration of the additive is more than 6 M/L, the ion conductivity of the electrolyte is lowered, and a high voltage may not be obtained. A more preferable range of the concentration is 0.0005 to 4 M/L.

By setting the concentration of the additive in the electrolyte in a range of 0.0001 to 6 M/L, the additive component existing on the electrode surface should be preferably about $1 \times 10^{-20}$ g/cm$^2$ to 1 g/cm$^2$. If the amount is less than $1 \times 10^{-20}$ g/cm$^2$, it may be hard to sufficiently suppress the corrosion of the negative electrode. If the amount is more than 1 g/cm$^2$, the ion conductivity may be lowered.

The amount of the additive forming the film may be measured by an electrochemical crystal resonator microbalance method. Further, the effects of the invention may be sufficiently observed if the amount can be confirmed by various spectrochemical methods such as infrared spectroscopy, nuclear magnetic resonance spectrum, and ultraviolet visible absorption spectrum.

(4-3) Solvent

As the solvent, for example, water, methyl ethyl carbonate, γ-butyrolactone may be used.

It is preferred to further contain halogen ions in the electrolyte. Halogen ions are contained, and thereby the ion conductivity of the electrolyte can be enhanced. As a result, the battery voltage can be improved.

A compound supplying halogen ions includes, for example, fluorides such as hydrofluoric acid, sodium fluoride, and ammonium fluoride, chlorides such as hydrochloric acid, aluminum chloride, lithium chloride, calcium chloride, and chromium chloride, bromides such as ammonium bromide, zinc bromide, and potassium bromide, and iodides such as ammonium iodide and sodium iodide.

The concentration of halogen ions in the electrolyte is preferred to be in a range of 0.01 to 6 M/L. If the concentration of halogen ions is less than 0.01 M/L, effects of adding halogen ions may not be obtained sufficiently. If the concentration of halogen ions is more than 6 M/L, the progress of self-discharge tends to increase due to corrosion of the negative electrode. The preferred range is 0.05 to 4 M/L.

5) Hydrogen Gas Permeable Organic Material

The hydrogen gas permeable organic material has a He gas permeability of $2 \times 10^{-10}$ (cm$^3$(STP) cm/sec·cm$^2$·cmHg) or more at 30° C.

The He gas permeability of the hydrogen gas permeable organic material at 30° C. is measured by a method disclosed, for example, in JIS K 7126(1987), which is Method of testing gas transmission rate through plastic film and sheet.

The gas generated during normal use or by misuse (for example, external short-circuit) consists essentially of hydrogen gas. If the He gas permeability at 30° C. is less than $2 \times 10^{-10}$ (cm$^3$(STP) cm/sec·cm$^2$·cmHg), it is practically difficult to release the hydrogen gas to the outside during normal use, and the internal pressure elevates along with progress of discharge, and the discharge capacity lowers.

By defining the He gas permeability $2 \times 10^{-10}$ (cm$^3$ (STP) cm/sec·cm$^2$·cmHg) or more at 30° C., hydrogen gas can be released outside without substantial loss of water vapor, and the battery internal pressure can be kept low without depletion of the electrolyte, so that the discharge capacity may be enhanced. If external short-circuit or sudden temperature rise occurs due to misuse or the like, gas mainly composed of hydrogen gas is generated violently. However, the gas diffusion can be encouraged according to the invention, and rupture can be decreased, and the battery safety can be further enhanced.

When the He gas permeability at 30° C. is greater, the transmission of hydrogen gas is increased, and transmission of water vapor is also higher. If the gas permeability exceeds $300 \times 10^{-10}$ (cm³(STP) cm/sec·cm²·cmHg), the discharge capacity may drop due to depletion of the electrolyte, and hence the gas permeability is preferred to be in a range from $2 \times 10^{-10}$ (cm³(STP)cm/sec·cm²·cmHg) or more and $300 \times 10^{-10}$ (cm³(STP)cm/sec·cm²·cmHg) or less.

A further preferred range of He gas permeability at 30° C. is $5 \times 10^{-10}$ to $250 \times 10^{-10}$ (cm³(STP) cm/sec·cm²·cmHg).

The hydrogen gas permeable organic material of which He gas permeability at 30° C. is $2 \times 10^{-10}$ (cm³(STP)cm/sec·cm²·cmHg) or more is preferred to longer in a distance between molecular chains and have a non-dense structure. Examples of such organic material include silicone rubber, polycarbonate, ethylene fluoride-propylene copolymer {Teflon FEP (registered trademark)}, natural rubber, butyl rubber, polybutadiene, ethyl cellulose, cellulose acetate, polystyrene, ethylene-vinyl acetate copolymer, and low density polyethylene. One or more kind of organic material may be used.

Among them, silicone rubber, polycarbonate, ethylene fluoride-propylene copolymer {Teflon FEP (registered trademark)}, and ethyl cellulose are particularly preferred. Note that nylon, polyvinylidene fluoride and polyacrylonitrile are poor in hydrogen gas permeability and are thus not preferred.

The tensile strength of the hydrogen gas permeable organic material at room temperature is preferred to be in a range of 1 to 100 MPa. The reason is explained below. If the tensile strength is less than 1 MPa, the entire member is too thick and thus may be inappropriate for composing the battery. On the other hand, if the tensile strength is more than 100 MPa, the thinnest portion is too thin, and it is hard to control the machining precision strictly. A more preferred range is 6 to 70 MPa.

When using a closed space constituent member containing the hydrogen gas permeable organic material (for example, negative electrode gasket or insulating washer), it is preferred to have a thinnest portion of thickness of 5 to 300 μm. If the thickness of the thinnest portion is less than 5 μm, the thinnest portion may be ruptured by the hydrogen gas generated during normal use, and the fluid-tightness of the battery may be extremely lowered. On the other hand, if the thickness of the thinnest portion is more than 300 μm, the thinnest portion is not ruptured in case of sudden elevation of internal pressure by misuse or the like, and the battery may rupture. A more preferred range of thickness of the thinnest portion is 10 to 250 μm.

The method of machining the thinnest portion is not particularly limited. The thinnest portion can be obtained by partial thinning in bowl or spherical form, or by cutting in ring or cylindrical form.

The thickness of the thinnest portion is determined according to be set depending on the tensile strength of the negative electrode gasket or insulating washer. In this calculation, estimating the maximum battery internal pressure in a range of 10 to 5 MPa (about 100 to 50 atm), the thickness of the thinnest portion is set so as to be ruptured within this pressure range. For example, when using polystyrene of a tensile strength of 50 MPa, the thinnest portion is preferred to be machined to a thickness of 5 to 300 μm. In a mounted state, the strength of the negative electrode gasket or insulating washer is assumed to vary according to the internal temperature of the battery, or presence or absence of reaction with the electrolyte. It is preferred to determine the final thickness of the thinnest portion by the strength of the gasket or washer in a standard state and evaluation in an actual operation test.

When the thickness of the thinnest portion is in a range of 5 to 300 μm, the tensile strength of the hydrogen gas permeable organic material at room temperature is preferably in a range of 1 to 100 MPa. In such a constitution, the safety may be further enhanced in case of sudden gas generation due to misuse or the like.

Other examples of the aluminum negative electrode battery of the invention will be explained.

A fourth aluminum negative electrode battery of the invention comprises:

a battery case;

a power generating element including an aqueous electrolyte and accommodated in the battery case; and a hydrogen gas permeable sheet arranged in an opening of the battery case, and having a water repellence of 2 kPa or more and a He gas permeability in a range of $2 \times 10^{-6}$ to $10000 \times 10^{-6}$ (cm³(STP) cm/sec·cm²·cmHg) at 30° C.

This battery case can be realized by a power generating element case serving also as positive electrode current collector or positive electrode, or a negative electrode case serving also as a negative electrode (for example, negative electrode can).

A fifth aluminum negative electrode battery of the invention comprises:

a power generating element case;

a cylindrical positive electrode mixture arranged in the power generating element case;

a bag-shaped separator arranged in a hollow space of the positive electrode mixture;

a negative electrode gel contained in the separator, and containing an aqueous electrolyte and a negative electrode active material containing at least one of aluminum and aluminum alloy; and a hydrogen gas permeable sheet arranged in an opening of the power generating element case so as to face at least part of the negative electrode gel, the separator and the positive electrode mixture, wherein the hydrogen gas permeable sheet has a water repellence of 2 kPa or more and a He gas permeability of a range of $2 \times 10^{-6}$ to $10000 \times 10^{-6}$(cm³(STP)cm/sec·cm²·cmHg) at 30° C.

Herein, as the power generating element case, a case serving also as positive electrode current collector or positive electrode is used. When serving also as the positive electrode current collector, the power generating element case can be formed of a positive electrode current collector constituent material as mentioned above.

A sixth aluminum negative electrode battery of the invention comprises:

a negative electrode case formed of a material containing aluminum or aluminum alloy;

a positive electrode mixture accommodated in the negative electrode case, and impregnated with an aqueous electrolyte;

a separator arranged between an inner wall of the negative electrode case and the positive electrode mixture; and a hydrogen gas permeable sheet arranged in an opening of the negative electrode case so as to face the separator and at least part of the positive electrode mixture, wherein the hydrogen gas permeable sheet has a water repellence of 2 kPa or more and a He gas permeability in a range of $2 \times 10^{-6}$ to $10000 \times 10^{-6}$ (cm³(STP)cm/sec·cm²·cmHg) at 30° C.

Once a discharge reaction takes place, discharge products of the negative electrode (for example, aluminum hydroxide) begin to gather between the separator and the negative electrode during discharge. Herein, if the dissolution of discharge products of the negative electrode is low and the diffusion speed of discharge products is slow for some reason, water molecules begin to gather at the surface of the separator that faces the negative electrode, by osmotic pressure phenomenon. Since the volume of the gap is small between the separator and the negative electrode, the collected electrolyte cannot be held in this place. If a gas permeable water repellent polymer film is arranged between the gasket and the bottom plate as disclosed, for example, in Jpn. Pat. Appln. KOKAI Publication No. 8-77996, liquid leak cannot be prevented sufficiently, and still worse the electrolyte collected between the water repellent polymer film and the gasket cannot return to the power generating element, and hence the electrolyte in the power generating element is reduced, and the discharge capacity is lowered, as clarified by the present inventor.

Also as investigated by the present inventor, since gas is generated during discharge reaction, if the opening of the battery case such as the positive electrode case and the negative electrode case is closed by using a material of very low gas permeability such as asphalt, the equilibrium of discharge reaction is broken, and the discharge reaction of the battery drops.

The inventor intensively accumulated studies and discovered as follows: when the opening of the battery case is closed by a hydrogen gas permeable sheet having a water repellence of 2 kPa or more and a He gas permeability in a range of $2\times10^{-6}$ to $10000\times10^{-6}$ ($cm^3$(STP)cm/sec·$cm^2$·cmHg) at 30° C., the liquid overflowing from the gap between the negative electrode and the separator can be returned to the positive electrode without allowing leakage outside of the battery, while the gas can be released out of the battery. As a result, both enhancement of discharge capacity and suppression of liquid leak can be realized at the same time.

The positive electrode, negative electrode, separator, and electrolyte used in the fourth to sixth aluminum negative electrode batteries are the same as those explained in the first to third batteries. The hydrogen gas permeable sheet is described below.

The He gas permeability of the hydrogen gas permeable sheet at 30° C. is measured by a method disclosed, for example, in JIS K 7126(1987) (Method of testing gas transmission rate through plastic film and sheet).

The He gas permeability of the hydrogen gas permeable sheet at 30° C. is limited within the above range because if the gas permeability is less than $2\times10^{-6}$ ($cm^3$(STP)cm/sec·$cm^2$·cmHg), the hydrogen gas transmission is lowered, and the hydrogen gas remains within the closed space in which the power generating element are accommodated, and hence the equilibrium of discharge reaction is broken and the discharge capacity of the battery drops. On the other hand, if the gas permeability is more than $10000\times10^{-6}$ ($cm^3$(STP)cm/sec·$cm^2$·cmHg), transmission of hydrogen gas increases, but transmission of a gas other than hydrogen gas (such as water vapor) also increases. If water vapor is released, the capacity may be lowered due to depletion of water in the electrolyte. A more preferred range is $2\times10^{-6}$ to $1000\times10^{-6}$ ($cm^3$(STP) cm/sec·$cm^2$·cmHg), and the most preferred range is $2\times10^{-6}$ to $400\times10^{-6}$ ($cm^3$(STP)cm/sec·$cm^2$·cmHg).

The water repellence of the hydrogen gas permeable sheet is defined within the specified range because if the water repellence is less than 2 kPa, leakage of electrolyte due to the creep phenomenon cannot be suppressed, and the electrolyte oozes out of the hydrogen gas permeable sheet, and as a result, the electrolyte cannot return to the positive electrode. A preferred range is 5.3 kPa or more. A more preferred range is 9.3 kPa or more. The liquid leak preventive effect is higher when the water repellence is higher, but if the water repellence is too high, the He gas permeability at 30° C. becomes smaller than $2\times10^{-6}$ ($cm^3$(STP)cm/sec·$cm^2$·cmHg), which is not preferable.

The water repellence of the hydrogen gas permeable sheet is measured in the following method. First, a hydrogen gas permeable sheet is attached to a pressure-proof glass tube of 1 cm in diameter. From one end of the glass tube, water is supplied at a rate of 0.1 cc/min by using a constant flow rate pump. Upon start of water supply, the water supplying pressure of the constant flow rate pump is the water repellence (kPa) of the hydrogen gas permeable sheet. Herein, the constant flow rate pump is a pump used in gas chromatography or the like, and this is a pump capable of pressurizing until a constant flow rate is obtained.

Between the hydrogen gas permeable sheet and the power generating element, it is preferred to provide an air chamber in a volume equivalent to 30% or less of the inner volume (100%) of the battery case (power generating element case or negative electrode case). The hydrogen gas permeable sheet can contact the power generating element, but by providing the air chamber between the power generating element and the hydrogen gas permeable sheet, the electrolyte may be temporarily stored in this space, so that the liquid leak occurrence may be further lowered. It is also possible to store the generated hydrogen gas temporarily, and it is hence effective to avoid sudden elevation of internal battery pressure due to generation of hydrogen gas. The volume of the air chamber is defined to be 30% or less of the inner volume of the battery case because the space for the power generating element is decreased if a wider air chamber is provided, thereby decreasing the discharge capacity. A preferred range of the volume of the air chamber is 0.5 to 15% of the inner volume of the battery case, and a more preferred range is 1 to 10%.

It is preferred to have a plurality of hydrogen gas permeable sheets. When provided with a plurality, it is more effective for suppressing leakage of the electrolyte from the battery. It is preferable to have two to five sheets. If too many, the space for the power generating element is decreased, and the discharge capacity may be decreased. It is preferable to leave a gap between the hydrogen gas permeable sheets. Without a gap, gas flow may be difficult. Note that the gap between the hydrogen gas permeable sheets should be 1 mm or more. If the gap between the hydrogen gas permeable sheets is more than 5 mm, however, the amount of the electrolyte returning to the positive electrode is decreased, and the discharge capacity may be lowered, and hence the gap between the hydrogen gas permeable sheets is preferred to be 1 mm or more and 5 mm or less.

The thickness of the hydrogen gas permeable sheet is preferred to be in a range of 0.1 to 3 mm. The reason is explained below. If the thickness is less than 0.1 mm, it is hard to prevent liquid leakage at the time of discharge and storage. On the other hand, if the thickness exceeds 3 mm, the diffusion speed of hydrogen gas drops and a high discharge capacity may not be obtained. A more preferred range of thickness is 0.15 mm to 1.2 mm.

As the hydrogen gas permeable sheet having a He gas permeability in a range of $2\times10^{-6}$ to $10000\times10^{-6}$($cm^3$(STP) cm/sec·$cm^2$·cmHg) at 30° C., for example, a sheet disclosed in Jpn. Pat. Appln. KOKAI Publication No. 3-284335 may be used, or a hydrogen gas permeable sheet may be prepared by an extrusion method, and the gas permeability may be adjusted by controlling the pores in the sheet by varying the air volume when performing the extrusion, or the gas permeability may be controlled by a method of dispersing alumina in the sheet and then removing it. In addition, the gas permeability may be also adjusted by preparing n sheets of a polymer sheet by weaving fibers in a specific direction, and overlaying by shifting the fiber direction by n/365° each.

The water repellence of the hydrogen gas permeable sheet can be controlled by, for example, varying the surface area of the sheet. This surface area varying method is realized, for example, by a melt blow process. Further, the surface area of the polymer sheet can be varied by using a polymer with a different molecular weight as the principal material, and the molecular weight of the polymer can be varied by changing by living polymerization.

Figure 5:
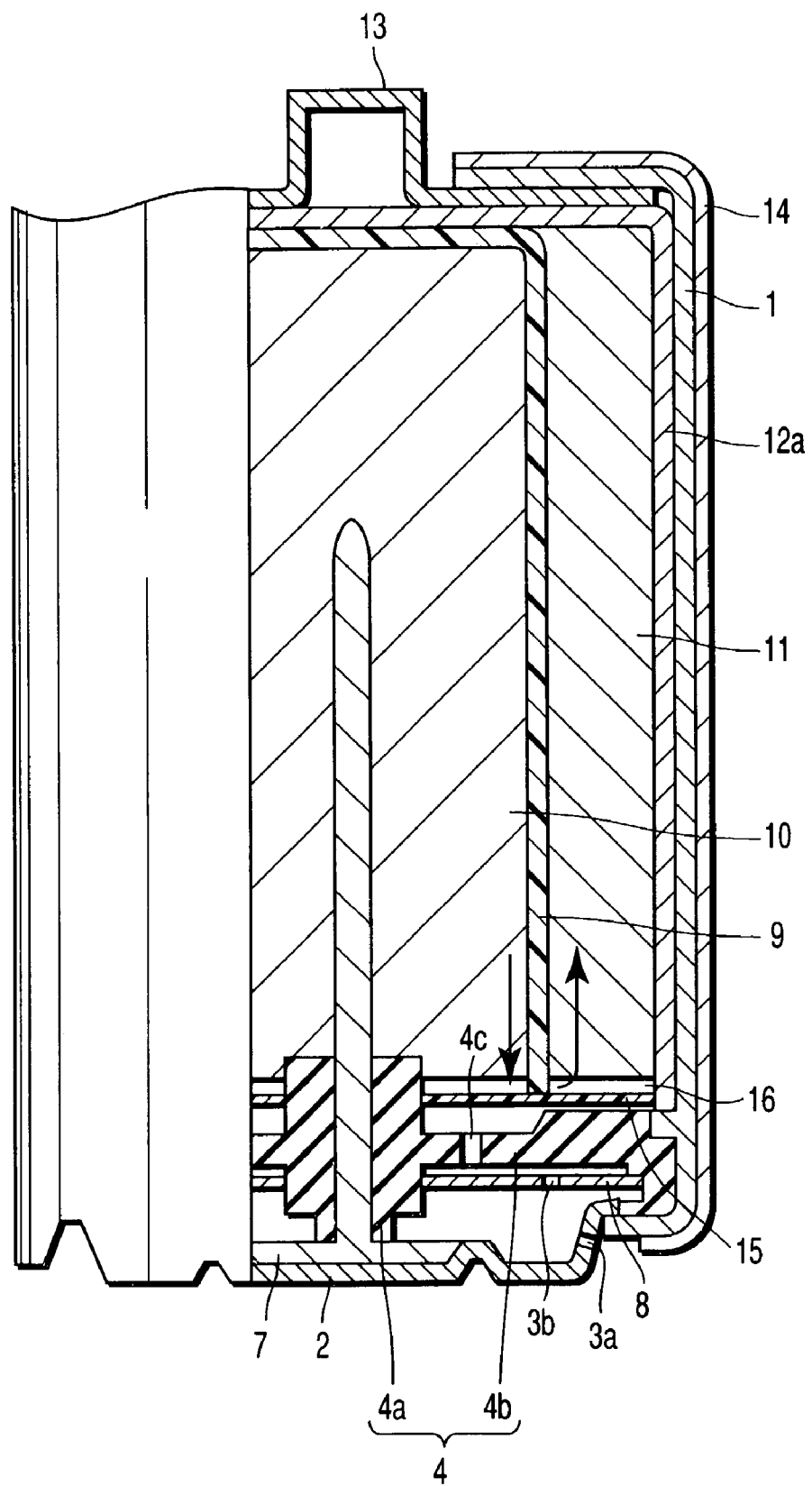
FIG. 5 is a partial sectional view of an aluminum negative electrode battery of an alkaline dry cell structure as an example of a fourth aluminum negative electrode battery of the invention.
Figure 6:
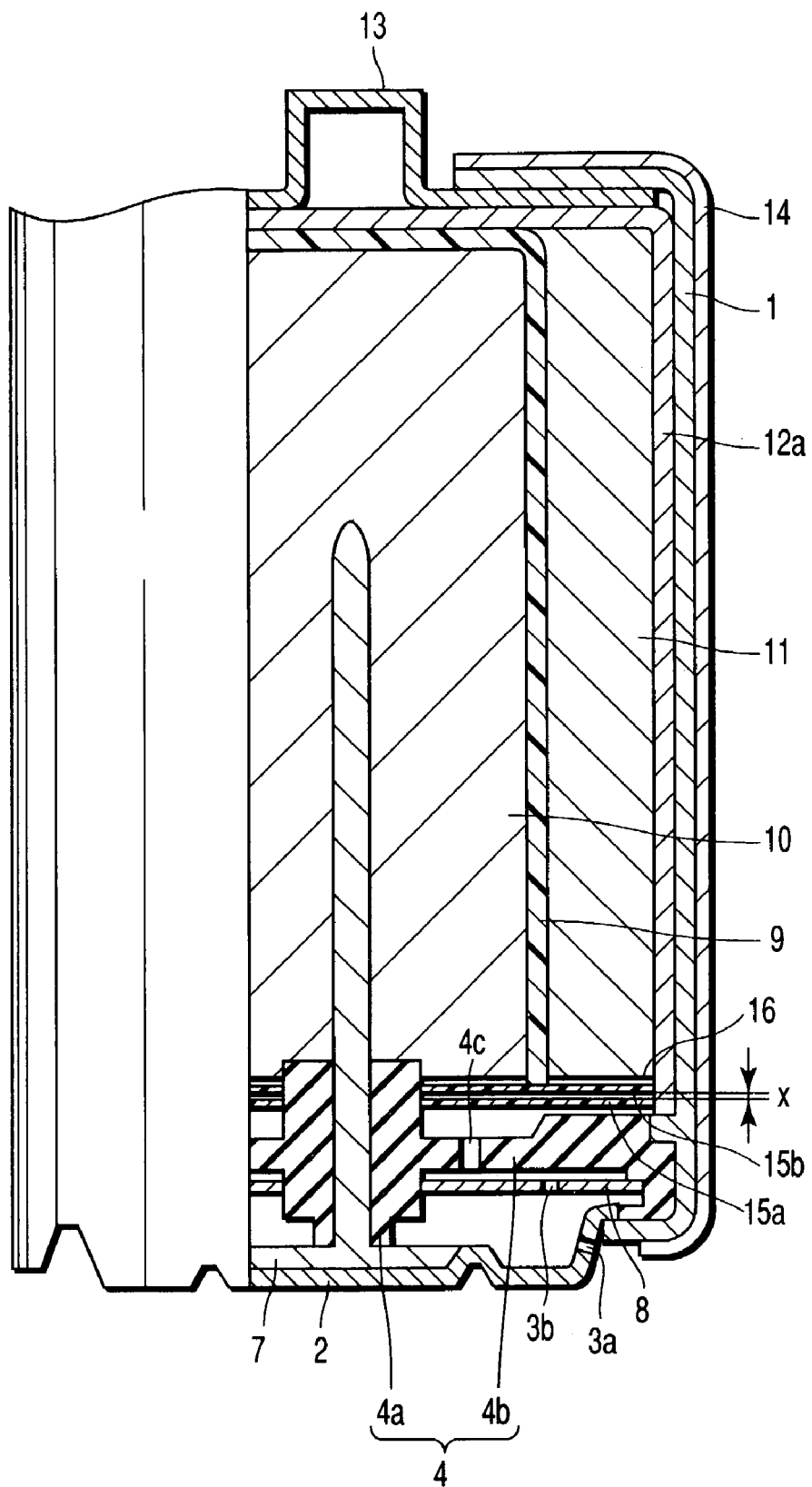
FIG. 6 is a partial sectional view showing another example of the aluminum negative electrode battery of an alkaline dry cell structure as an example of the fourth aluminum negative electrode battery of the invention.

A specific example of the fourth battery of the invention is explained in FIG. 5 and FIG. 6. In FIG. 5 and FIG. 6, the same members as explained in FIG. 1 are identified with same reference numerals, and a detailed description is omitted.

An annular hydrogen gas permeable sheet 15 having a He gas permeability in a range of $2 \times 10^{-6}$ to $10000 \times 10^{-6}$ ($cm^3$ (STP)cm/sec·$cm^2$·cmHg) at 30° C., and a water repellence of 2 kPa or more is fixed between an inner wall of an opening of a power generating element case (battery case) 12a and the support 4a of the negative electrode gasket 4 by an impact resilience of the negative electrode gasket 4. That is, the opening of the battery case 12a is closed by an inner sealing body having the hydrogen gas permeation sheet 15 and the negative electrode gasket 4. By providing the hydrogen gas permeable sheet 15 in such a configuration, the power generating element (including negative electrode gel 10, separator 9, and positive electrode mixture 11) can be accommodated within a closed space. The hydrogen gas permeable sheet 15 faces the lower surface of the positive electrode mixture 11, the lower surface of the separator 9, and the negative electrode gel 10 visible at the opening side of the power generating element case 12a. An air chamber 16 is a space provided in the power generating element case 12a and between the power generating element and the hydrogen gas permeable sheet 15.

As described herein, by providing the hydrogen gas permeable sheet 15 as a water repellent member, the electrolyte overflowing from the gap between the negative electrode gel 10 and the separator 9 can be returned to the positive electrode mixture 11, thereby suppressing leakage from the battery. An example of a circulation route for an electrolyte is indicated by arrow in FIG. 5. The hydrogen gas generated at the time of discharge passes through the hydrogen gas permeable sheet 15, runs through a gas vent 4c in the negative electrode gasket 4 and a gas vent 3b in the metal washer 8, and passes through a very small gap existing between the bottom plate 2 and the outer casing 1 or the gas vent 3a in the bottom plate 2, and is released to the outside.

In FIG. 5, only one hydrogen gas permeable sheet 15 is used as a water repellent member, but two or more sheets may be also used. Such an example is shown in FIG. 6. That is, a first annular hydrogen gas permeable sheet 15b is fixed between the inner surface of the opening of the power generating element case 12a and the support 4a of the negative electrode gasket 4 by an impact resilience of the negative electrode gasket 4, with its upper surface kept in contact with the lower end of the separator 9. A second annular hydrogen gas permeable sheet 15a is fixed between the inner surface of the opening of the power generating element case 12a and the support 4a of the negative electrode gasket 4 by an impact resilience of the negative electrode gasket 4, with a gap X provided against the first annular hydrogen gas permeable sheet 15b. The air chamber 16 is a space provided in the power generating element case 12a and between the power generating element and first hydrogen gas permeable sheet 15b.

Figure 7:
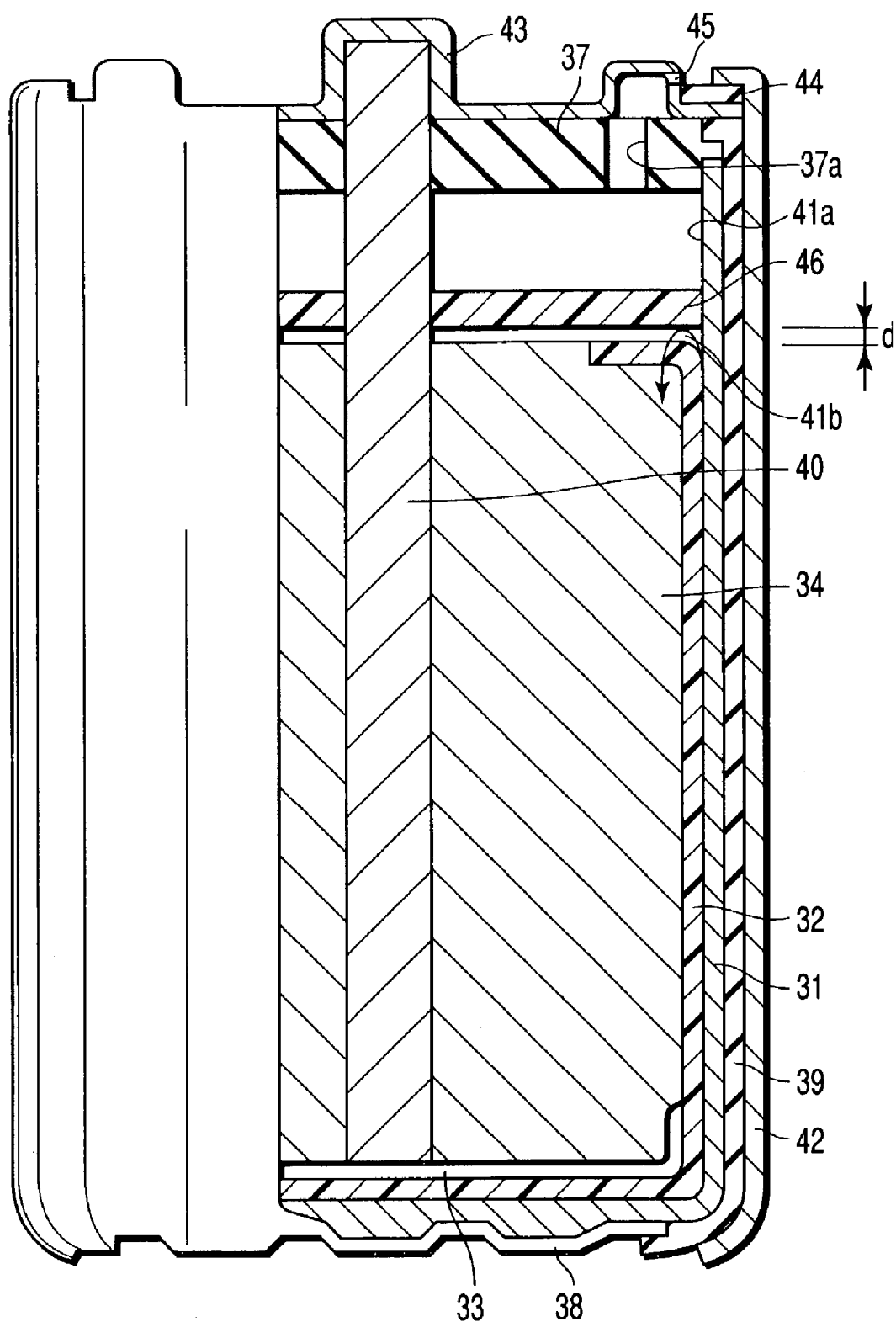
FIG. 7 is a partial sectional view showing an aluminum negative electrode battery of a manganese dry cell structure as an example of a fifth aluminum negative electrode battery of the invention.
Figure 8:
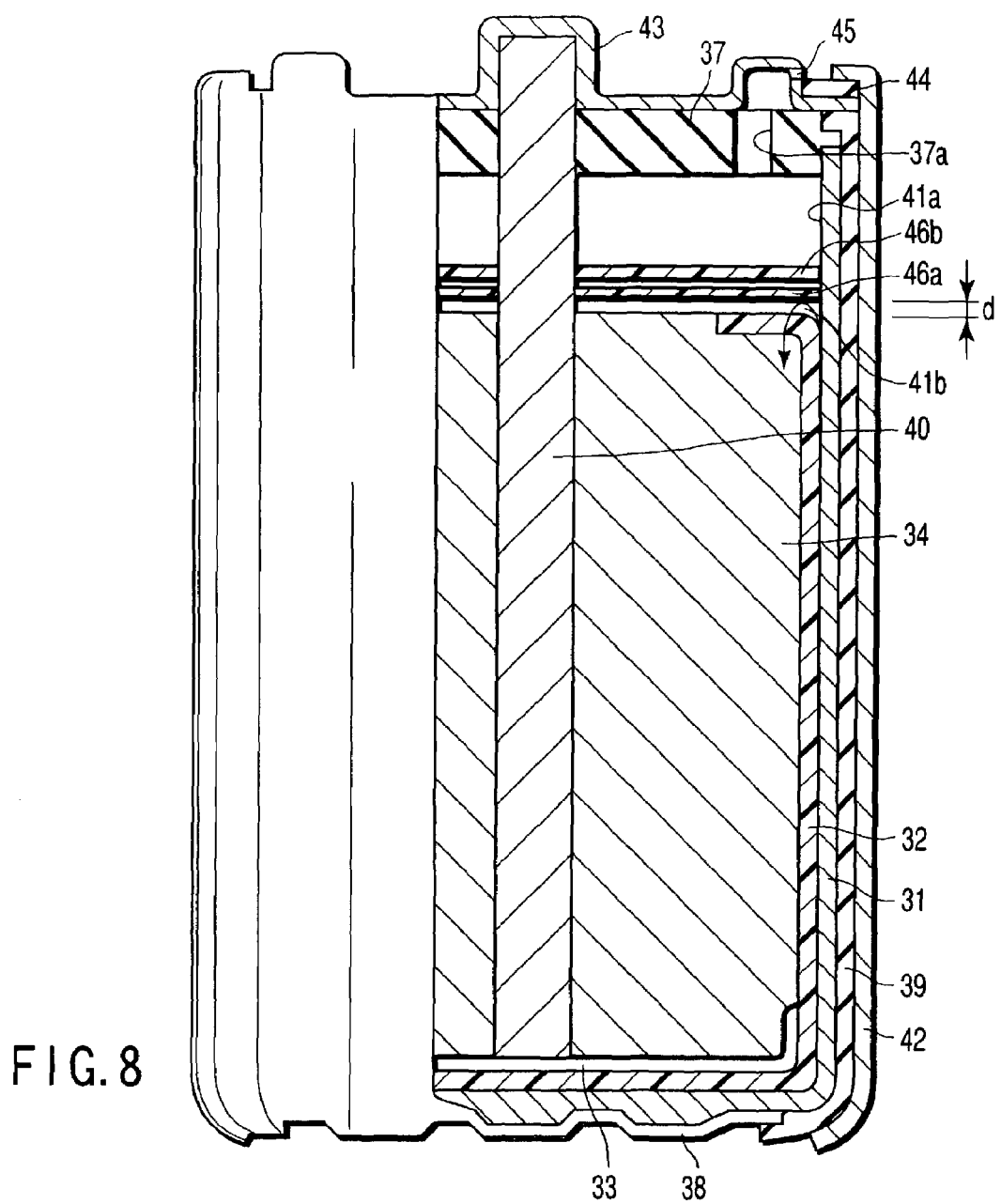
FIG. 8 is a partial sectional view showing another example of the aluminum negative electrode battery of a manganese dry cell structure as an example of the fifth aluminum negative electrode battery of the invention.

A specific example of the fifth aluminum negative electrode battery of the invention is explained in FIG. 7 and FIG. 8. In FIG. 7 and FIG. 8, the same members as explained in FIG. 4 are identified with same reference numerals, and detailed description is omitted.

Herein, instead of the wax layer 36 and brim paper 35 shown in FIG. 4, an annular hydrogen gas permeable sheet 46 having a He gas permeability in a range of $2 \times 10^{-6}$ to $10000 \times 10^{-6}$ ($cm^3$(STP) cm/sec·$cm^2$·cmHg) at 30° C., and a water repellence of 2 kPa or more is used. The hydrogen gas permeable sheet 46 is fitted between the inner surface of the negative electrode can 31 (battery case) and the positive electrode current collector rod 40 so as to be placed between the positive electrode mixture 34 and the washer 37. That is, the opening of the negative electrode can 31 is closed by an inner sealing body having the hydrogen gas permeation sheet 46 and the positive electrode current collector rod 40. Thus, the power generating element (including the separator 32 and positive electrode mixture 34) can be enclosed. The hydrogen gas permeable sheet 46 faces the upper surface of the separator 32 and the upper surface of positive electrode mixture 34, visible at the opening side of the negative electrode can 31. A first air chamber 41a is a space provided in the negative electrode can 31 and between the hydrogen gas permeable sheet 46 and the washer 37. A second air chamber 41b is a space provided between the hydrogen gas permeable sheet 46 and the power generating element.

As described herein, by providing the hydrogen gas permeable sheet 46 as a water repellent member, the electrolyte overflowing from the gap between the negative electrode can 31 and the separator 32 can be returned to the positive electrode mixture 34, thereby suppressing leakage from the battery. An example of the circulation route for the electrolyte is indicated by an arrow in FIG. 7. The hydrogen gas generated at the time of discharge passes through the hydrogen gas permeable sheet 46, runs through a gas vent 37a in the insulating washer 37, and passes through a very small gap existing between the sealing plate 43 and the outer casing 42, and is released to outside.

The volume of the second air chamber 41b is preferred to be not more than 30% of the inner volume of the negative electrode can 31 (battery case) owing to the reason explained above. As shown in FIG. 8, meanwhile, when two hydrogen gas permeable sheets 46a, 46b are used as a water repellent member, it is preferred to provide the second air chamber 41b of 30% or less of the inner volume of the battery case between the hydrogen gas permeable sheet 46a closest to the power generating element and the power generating element.

The brim paper is not necessary when providing the hydrogen gas permeable sheet 46, and may not be provided. If provided, it is preferred to be arranged in the first air chamber 41a, because circulation of electrolyte is disturbed when located between the positive electrode mixture 34 and the hydrogen gas permeable sheet 46. When the brim paper or washer is arranged in a plurality, the liquid leak preventive performance is improved, but the amount of the electrode active material filled is decreased, and hence one piece each is preferred. The washer and positive electrode terminal plate are preferred to have a hole for releasing the gas generated inside. The hole is preferred to be closed by a rubber valve or the like, thereby opening and closing the hole repeatedly. Alternatively, when the hydrogen gas permeable member is overlaid and arranged each of the inner surface of the washer and the positive electrode terminal plate so as to cover the hole in the washer and positive electrode terminal plate, it can function sufficiently as a safety vent. In addition, without requiring any particular hole, by controlling the size of the gap, gas can be released outside of the battery from a gap between the washer 37 and the negative electrode can 31 or a gap between the washer 37 and positive electrode current collector 40. Further, as a safety vent in case of abnormal discharge, a thinnest portion may be formed by cutting off part of the hydrogen gas permeable sheet 46, brim paper, washer 37, positive electrode terminal plate 43, or negative electrode can 31. The thickness t of the thinnest portion is preferred to be in a range of 5 to 300 μm.

A seventh aluminum negative electrode battery of the invention will be explained.

The seventh aluminum negative electrode battery of the invention comprises:

a negative electrode including an active material containing at least one of aluminum and aluminum alloy;

a positive electrode;

a separator which is provided between the negative electrode and the positive electrode, and has a first hydrophobic surface facing the negative electrode and a second hydrophobic surface facing the positive electrode; and an aqueous electrolyte.

According to this aluminum negative electrode battery, the liquid leak resistance can be enhanced. That is, in the battery having the negative electrode containing at least one of aluminum and aluminum alloy, the negative electrode discharge product such as aluminum hydroxide is dissolved in the electrolyte during discharge, so that the electrolyte in the separator moves to the negative electrode by the osmotic pressure phenomenon. When the hydrophilic property of the separator is high, since the electrolyte holding property of the separator is high, the electrolyte is likely to move from the separator to the negative electrode due to the osmotic pressure phenomenon. As a result, an excessive amount of electrolyte is supplied into the negative electrode, and the excessive amount of the electrolyte not absorbed in the negative electrode flows out from the interface of the negative electrode and the separator, thereby leaking out.

Since the separator having the first hydrophobic surface and second hydrophobic surface is lower in the electrolyte holding property as compared with the hydrophilic separator, the amount of electrolyte moving from the separator to the negative electrode due to osmotic pressure phenomenon can be reduced. As a result, the amount of electrolyte supplied from the separator to the negative electrode is appropriate, and therefore leak of electrolyte from the interface of the negative electrode and separator can be suppressed, so that the liquid leak rate can be kept low.

A sufficient discharge characteristic can be obtained by defining the air permeability of the separator in a range of 1 sec/100 mL to 20 sec/100 mL, the thickness in a range of 10 μm to 200 μm, and the METSUKE (weight per unit area) in a range of 10 g/m$^2$ to 150 g/m$^2$.

Further, by using the separator having the first hydrophobic surface and second hydrophobic surface in the fourth, fifth or sixth aluminum negative electrode battery having a hydrogen gas permeable sheet, it is possible to realize an aluminum negative electrode battery of high capacity with the further reduced liquid leak rate at deep discharge density.

This separator will be described specifically below.

The separator having the first hydrophobic surface and second hydrophobic surface is realized, for example, by applying hydrophobic treatment on the surface facing the negative electrode and the surface facing the positive electrode of a hydrophilic sheet. Also, a hydrophobic sheet can be used as the separator.

The hydrophobic sheet is, for example, a nonwoven fabric or woven fabric formed of hydrophilic fibers, or porous film formed of hydrophobic material. Hydrophobic materials include, for example, at least one material selected from the group consisting of polyolefin such as polyethylene or polypropylene, polystyrene, acetyl cellulose, ethyl cellulose and nylon.

Examples of the hydrophilic sheet include a kraft paper and glass fiber sheet. The hydrophobic treatment includes a method of coating or spraying a solution containing fluororesin such as polytetrafluoroethylene on a hydrophilic sheet.

Figure 9:
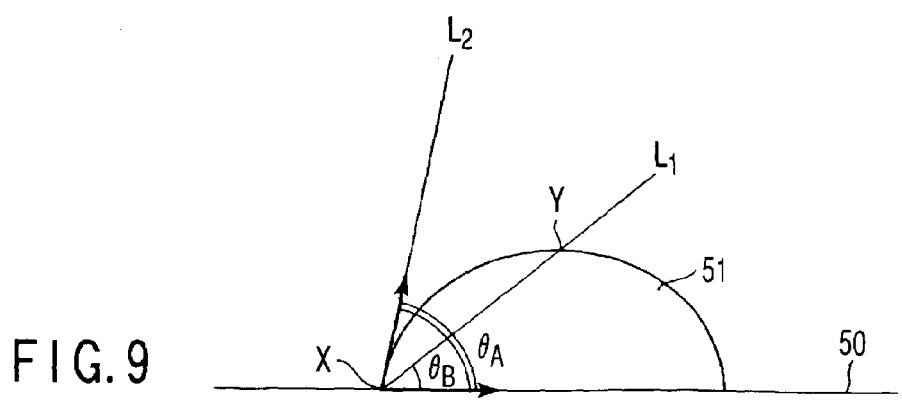
FIG. 9 is a schematic view explaining a method of measuring a contact angle of water on a separator surface.

The contact angle of the first hydrophobic surface on water and the contact angle of the second hydrophobic surface on water are preferred to be in a range of 10 degrees to 100 degrees. The contact angle is measured by a liquid drop method. This liquid drop method is explained by referring to FIG. 9. On a separator surface 50 in area defined by the product of 2 cm and 5 cm, 0.1 mL of pure water is dropped. A line connecting a contact point X of liquid drop 51 and the separator surface 50 and the top point Y of the liquid drop 51 is supposed to be $L_1$, and an angle $\theta_B$ formed by the line $L_1$ and the separator surface 50 is measured. By using this angle $\theta_B$, an angle $\theta_A$ formed by a tangent $L_2$ of the liquid drop 51 and the separator surface 50 is obtained according to the following formula (A), which is the contact angle $\theta_A$:

$$\theta_A = 2 \times \theta_B \quad (A)$$

When the contact angle $\theta_A$ is less than 10 degrees, the hydrophobic property of the separator is insufficient, and the liquid leak rate may be higher. When the angle $\theta_A$ is larger, the liquid leak effect is higher, and hence the angle $\theta_A$ preferred to be 20 degrees or more, and more preferably 45 degrees or more. However, if the contact angle $\theta_A$ is excessive, the separator may run out of the electrolyte during discharge, and hence the contact angle $\theta_A$ is preferred to be 175 degrees or less.

The air permeability of the separator is preferred to be in a range of 1 sec/100 mL or more and 20 sec/100 mL or less. The reason is explained below. If the air permeability is less than 1 sec/100 mL, the separator becomes very scarce, and a sufficient spacing cannot be kept between the positive electrode and the negative electrode, thereby leading to possibility of short-circuiting. On the other hand, if the air permeability is more than 20 sec/100 mL, the separator becomes dense, and the resistance of the separator is too high, and the discharge reaction may be impeded. A more preferred range of air permeability is 2 sec/100 mL or more and 12 sec/100 mL or less. The air permeability is measured according to par. 12.1 "Air tightness" of JIS C 2111(1997), which is Test methods of electrical insulating papers, by using a B type testing device (Garlay densometer). In this test, an adapter with hole diameter of 6 mm is used.

The thickness of the separator is preferred to be 10 μm or more and 200 μm or less. The reason is as follows. If the thickness is less than 10 μm, a sufficient spacing cannot be kept between the positive electrode and the negative electrode, and the strength is insufficient, thereby leading to as higher possibility of short-circuiting. On the other hand, if the thickness is more than 200 μm, the resistance of the separator is excessive and discharge reaction may be impeded. A more preferred range of thickness is 20 μm or more and 180 µm or less. The thickness of the separator is measured by a dead weight micrometer conforming to ISO534.

The METSUKE of the separator is preferred to be 10 g/m² or more and 150 g/m² or less. The METSUKE means a separator weight per unit area. The reason is explained below. If the METSUKE is less than 10 g/m², the strength is insufficient and possibility of short-circuiting is high. If the METSUKE is more than 150 g/m², the resistance of the separator is excessive and discharge reaction may be impeded. A more preferred range of METSUKE is 25 g/m² or more and 70 g/m² or less.

If the weight of the separator per unit area of the separator is not uniform, fluctuations of internal resistance of cells are significant, and the uniformity of the battery performance drops. Still worse, fluctuations of the METSUKE may also lead to short-circuiting. Hence, the weight of the separator per unit area is preferred to be uniform. The separator is preferred to be smaller in resistance and larger in shielding performance, that is, smaller in thickness and larger in air permeability, so that the fiber diameter for composing the separator is desired to be smaller. A preferred range of the fiber diameter is 50 µm or less. From such viewpoint, the separator is preferred to be manufactured by, for example, a melt blow process. As the form of the separator, a nonwoven fabric is preferred. As far as the uniformity of METSUKE is high, the separator resistance is low, and the shielding performance is large, the manufacturing method and form of the separator are not particularly specified.

The positive electrode, negative electrode, and electrolyte of the seventh aluminum negative electrode battery of the invention are same as listed in the first to third aluminum negative electrode batteries.

Figure 10:
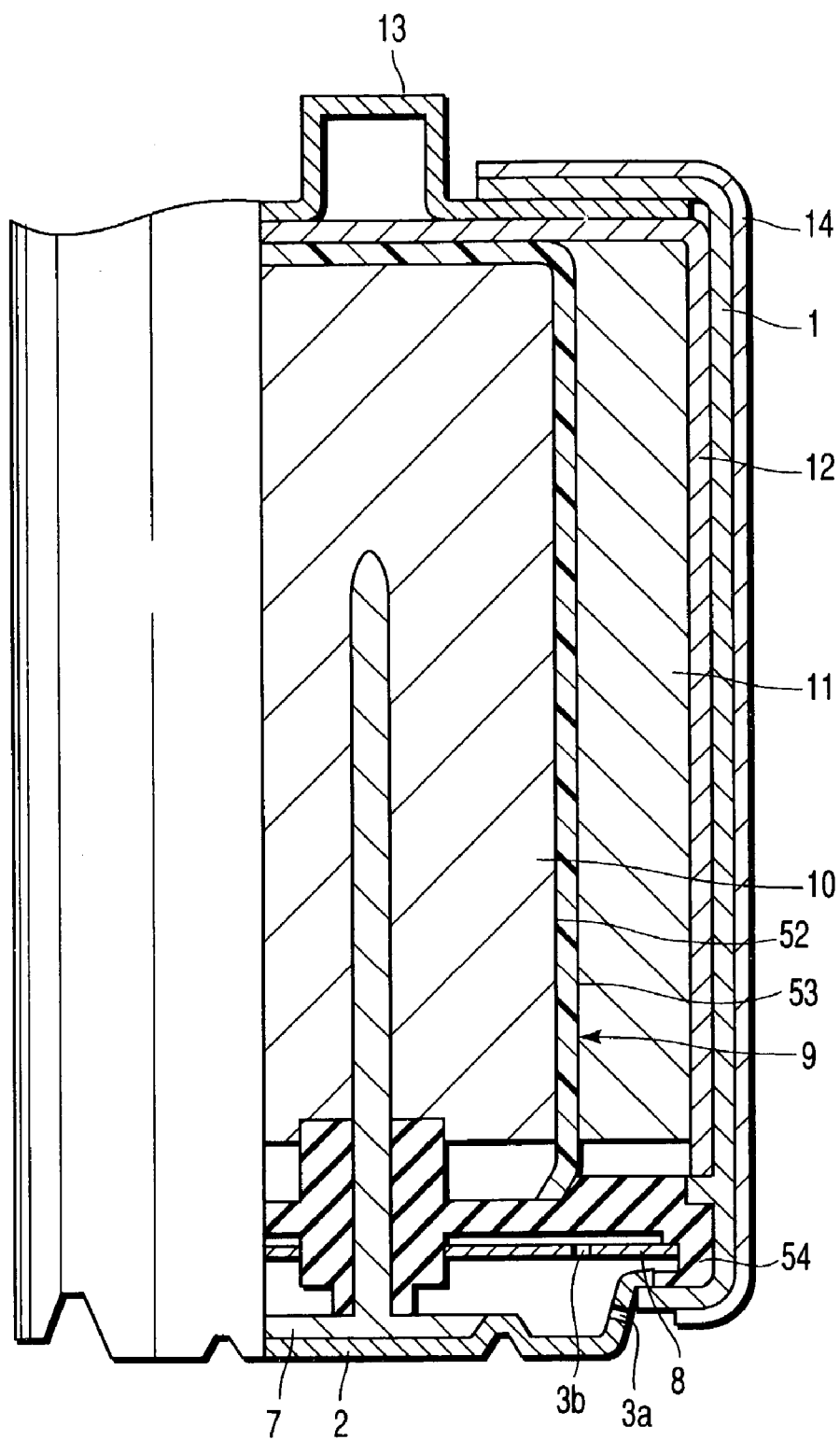
FIG. 10 is a partial sectional view of an aluminum negative electrode battery of an alkaline dry cell structure as an example of a sixth aluminum negative electrode battery of the invention.
Figure 11:
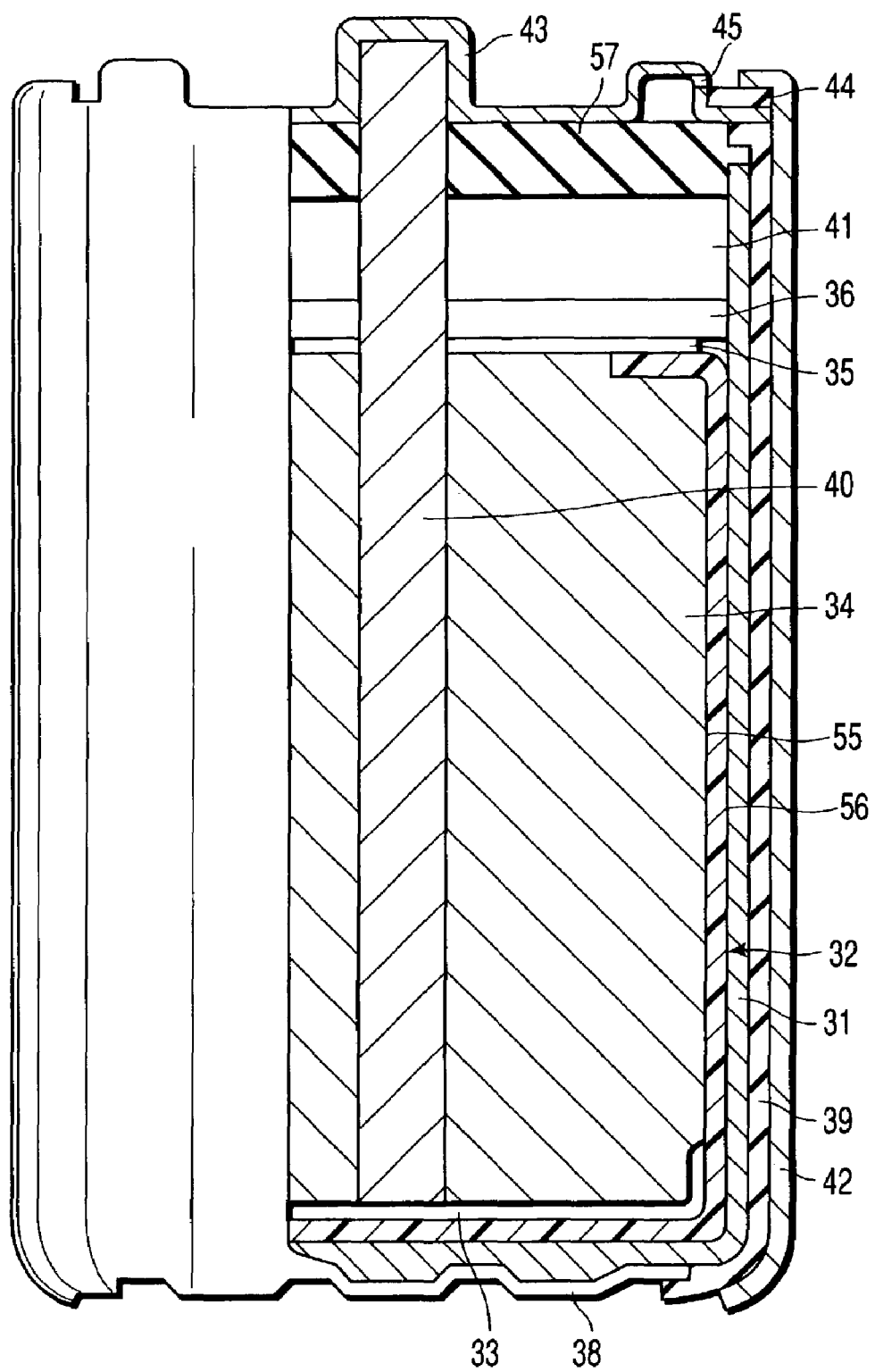
FIG. 11 is a partial sectional view of an aluminum negative electrode battery of a manganese dry cell structure as an example of the sixth aluminum negative electrode battery of the invention.

An example of the seventh aluminum negative electrode battery of the invention explained below by referring to FIG. 10 and FIG. 11. In FIG. 10 and FIG. 11, same members as explained in the foregoing FIG. 1 and FIG. 4 are identified with same reference numerals and duplicate explanation is omitted.

FIG. 10 is an example of an aluminum negative electrode battery having an alkaline dry cell structure. The inner surface of the bag-shaped separator 9, that is, the surface facing the negative electrode gel 10 is a first hydrophobic surface 52. The outer surface of the bag-shaped separator 9, that is, the surface facing both of the inner periphery of the positive electrode mixture 11 and the bottom of the positive electrode can 12 is a second hydrophobic surface 53. On the other hand, a negative electrode gasket 54 has a same structure as explained in FIG. 1 except that circular groove is not machined. The material for forming the negative electrode gasket 54 may be same as the hydrogen gas permeable organic material, for example, as explained in the foregoing first to third aluminum negative electrode batteries.

FIG. 11 is shows an example of the aluminum negative electrode battery having a manganese dry cell structure. The inner surface of the separator 32, that is, the surface facing the outer periphery of the positive electrode mixture 34 is a second hydrophobic surface 55. The outer surface of the separator 32, that is, the surface facing the inner periphery of the negative electrode can 31 is a first hydrophobic surface 56. On the other hand, an insulating washer 57 has the same structure as explained in FIG. 4 except that notch is not formed. The material for forming the insulating washer 57 may be same as the hydrogen gas permeable organic material, for example, as explained in the foregoing first to third aluminum negative electrode batteries.

Referring now to the drawings, Examples of the invention will be described in detail below.

EXAMPLE 1

An aluminum negative electrode battery having an alkaline dry cell structure as shown in FIG. 1 and FIG. 2 was manufactured in the following procedure.

<Preparation of Positive Electrode>

Using electrolytic manganese dioxide ($MnO_2$) as positive electrode active material, 10 wt. % of acetylene black as conductive agent and 3 wt. % of polytetrafluoroethylene as a binder were added and mixed in this positive electrode active material, and pressed and formed in a cylindrical form, and a positive electrode mixture was prepared. A carbon film of carbon fiber of 100 µm in thickness was prepared as a positive electrode current collector.

<Preparation of Electrolyte>

An aqueous solution was prepared by mixing 1 M/L of $AlCl_3$, 0.1 M/L of 2,2-bipyridyl, 0.5 M/L of KCl, and 0.2 M/L of $Al(NO_3)_3$.

<Preparation of Negative Electrode>

Mixing 95 wt. % of aluminum powder with purity of 99.99% (4N) and 4 wt. % of acrylic acid polymer as thickener, an electrolyte was added to prepare a negative electrode gel. A metal rod of tungsten was prepared as negative electrode current collector.

<Assembling of Battery>

A negative electrode gasket having the structure as shown in FIG. 1 and FIG. 2 was prepared. The material of this negative electrode gasket was an ethylene fluoride-propylene copolymer (Teflon FEP (registered trademark)} having a He gas permeability at 30° C. of $62 \times 10^{-10}$ ($cm^3$(STP)cm/sec·$cm^2$·cmHg), and a tensile strength at room temperature of 26 MPa. The thickness t of the thinnest portion formed by a circular groove was 100 µm. The He gas permeability of the resin at 30° C. was measured by a method conforming to JIS K 7126(1987) (Method of testing gas transmission rate through plastic film and sheet).

In a positive electrode can of cylindrical form with a bottom, a positive electrode current collector was arranged together with a cylindrical positive electrode mixture and a glass fiber separator with thickness of 30 µm, and a space provided by this separator was filled with a negative electrode gel. Thereafter, an electrolyte was poured into the positive electrode mixture, separator, and negative electrode gel. After inserting the negative electrode current collector into the negative electrode gel, the sealing was performed by using a bottom plate serving also as negative electrode terminal, a sealing plate serving also as a positive electrode terminal, and a polypropylene outer casing, a cylindrical aluminum negative electrode battery of 14 mm in diameter and 50 mm in overall height, having a structure as shown in FIG. 1 and FIG. 2, was assembled.

In the obtained battery, when the electromotive force, and the battery capacity by discharging until a voltage of 0.65 V by constant current discharge at 100 mA were measured, the electromotive force was 1.86 V and the capacity was 2800 mAh, and both high voltage and large capacity were obtained, while the weight was only 18 g.

EXAMPLES 2 TO 18 COMPARATIVE EXAMPLES 1 AND 2

Aluminum negative electrode batteries were fabricated in the same procedure as in Example 1, except that the materials of the negative electrode and negative electrode gasket and the thickness of the thinnest portion were varied as shown in Table 1.

COMPARATIVE EXAMPLE 3

A zinc manganese battery was prepared in the same procedure as in Example 1, except that zinc was used as negative electrode active material and 1 M/L aqueous solution of zinc chloride was used as electrolyte.

COMPARATIVE EXAMPLE 4

A zinc manganese battery was prepared in the same procedure as in Comparative example 3, except that the material of the negative electrode gasket and the thickness of the thinnest portion were changed as shown in Table 1.

In the obtained batteries of Examples 2 to 18 and Comparative examples of 1 to 4, the electromotive force, and the battery capacity by discharging until a voltage of 0.65 V by constant current discharge at 100 mA were measured, and results as shown in Table 2 were obtained. The battery weight was also measured, results are shown also in Table 2.

The aluminum alloy in Table 1 was prepared by using 4N-Al and additive elements. In the table, the low density polyethylene refers to a density of 0.91 to 0.93 g/cm$^3$, and the high density polyethylene refers to a density of 0.94 to 0.96 g/cm$^3$. As the ethylene fluoride-propylene copolymer, Teflon FEP (registered trademark) was used.

TABLE 1

| | Gasket material | Gas permeability in 30° C. and He gas ($10^{-10}$ cm$^3$ (STP) cm/sec · cm$^2$ · cmHg) | Tensile strength (MPa) | Thickness of thinnest portion (μm) | Negative electrode material |
|---|---|---|---|---|---|
| Example 1 | Teflon FEP | 62 | 26 | 100 | 4N—Al |
| Example 2 | Polystyrene | 35 | 35 | 140 | 4N—Al |
| Example 3 | Polycarbonate | 65 | 60 | 10 | 4N—Al |
| Example 4 | Cellulose acetate | 14 | 42 | 120 | 4N—Al |
| Example 5 | Ethyl cellulose | 30 | 32 | 160 | 4N—Al |
| Example 6 | Ethylene-ethyl acetate copolymer | 20 | 70 | 75 | 4N—Al |
| Example 7 | Low density polyethylene | 5 | 20 | 250 | Mn1.5%—Al98.5% alloy |
| Example 8 | Teflon FEP | 62 | 26 | 190 | Mg5%—Al95% alloy |
| Example 9 | Teflon FEP | 62 | 26 | 190 | Pb0.05%—Al99.95% alloy |
| Example 10 | Teflon FEP | 62 | 26 | 190 | Mg2%—Cr3.5%—Al94.5% alloy |
| Example 11 | Teflon FEP | 62 | 26 | 190 | In0.05%—Mn5%—Al94.5% alloy |
| Example 12 | Polycarbonate | 65 | 60 | 10 | Ca0.05%—Mn5%—Al94.5% alloy |
| Example 13 | Polycarbonate | 65 | 60 | 10 | Sn0.05%—Mn5%—Al94.5% alloy |
| Example 14 | Silicone rubber | 230 | 1.47 | 300 | 4N—Al |
| Example 15 | Natural rubber | 36 | 25 | 150 | 4N—Al |
| Example 16 | Butyl rubber | 8.42 | 14.7 | 280 | 4N—Al |
| Example 17 | Teflon FEP | 62 | 26 | 190 | 4N—Mg |
| Example 18 | Teflon FEP | 62 | 26 | 190 | 5% Zn—95% Al alloy |
| Comparative Example 1 | Nylon 6 | 0.6 | 60 | 85 | 4N—Al |
| Comparative Example 2 | High density polyethylene | 1.5 | 31 | 160 | 4N—Al |
| Comparative Example 3 | Teflon FEP | 62 | 26 | 100 | 4N—Zn |
| Comparative Example 4 | High density polyethylene | 1.5 | 31 | 160 | 4N—Zn |

TABLE 2

|  | Electromotive force (V) | Capacity (mAh) | Weight (g) |
|---|---|---|---|
| Example 1 | 1.86 | 2800 | 18 |
| Example 2 | 1.86 | 2800 | 18 |
| Example 3 | 1.87 | 2850 | 18 |
| Example 4 | 1.87 | 2830 | 18 |
| Example 5 | 1.88 | 2860 | 18.1 |
| Example 6 | 1.86 | 2850 | 18 |
| Example 7 | 1.86 | 2280 | 18 |
| Example 8 | 1.82 | 2780 | 18.1 |
| Example 9 | 1.81 | 2820 | 18.1 |
| Example 10 | 1.8 | 2680 | 18 |
| Example 11 | 1.8 | 2710 | 18 |
| Example 12 | 1.86 | 2750 | 18 |
| Example 13 | 1.85 | 2690 | 18 |
| Example 14 | 1.85 | 2800 | 18 |
| Example 15 | 1.85 | 2750 | 18 |
| Example 16 | 1.84 | 2300 | 18 |
| Example 17 | 1.95 | 2830 | 18.1 |
| Example 18 | 1.87 | 2780 | 18 |
| Comparative Example 1 | 1.87 | 1860 | 18.2 |
| Comparative Example 2 | 1.88 | 1960 | 18.2 |
| Comparative Example 3 | 1.63 | 1700 | 21.5 |
| Comparative Example 4 | 1.64 | 1695 | 21.4 |

As clear from Table 1 and Table 2, the batteries of Examples 1 to 18 comprising negative electrode gaskets containing a hydrogen gas permeable organic material of which He gas permeability at 30° C. is $2 \times 10^{-10}$ ($cm^3$(STP) cm/sec·$cm^2$·cmHg) or more are higher in discharge capacity as compared with batteries of Comparative examples 1 and 2 comprising negative electrode gaskets containing a hydrogen gas permeable organic material of which He gas permeability is less than $2 \times 10^{-10}$ ($cm^3$(STP)cm/sec·$cm^2$·cmHg).

Compared with the batteries in Comparative examples 3 and 4, if Zn is used as the negative electrode active material, it is understood that the discharge capacity is not expected to be improved substantially even if the negative gasket material contains a hydrogen gas permeable organic material of which He gas permeability at 30° C. is $2 \times 10^{-10}$ ($cm^3$(STP)cm/sec·$cm^2$·cmHg) or more.

EXAMPLE 19

A coin type aluminum negative electrode battery as shown in FIG. 3 was manufactured in the method explained below.

<Preparation of Positive Electrode>

Manganese dioxide ($MnO_2$) as positive electrode active material, 7.5 wt. % of acetylene black as conductive agent and 5.0 wt. % of polytetrafluoroethylene were mixed, and then pressed and formed in pellets to prepare a positive electrode mixture.

<Preparation of Electrolyte>

An aqueous solution was prepared by mixing 1 M/L of sulfuric acid, 0.25 M/L of KCl, 0.1 M/L of 2.2-dipyridyl, and 0.2 M/L of $Al(NO_3)_3$.

<Assembly of Battery>

In a negative electrode container of cylindrical form with a bottom, the container being made of aluminum with a purity of 99.99%, a glass fiber sheet of 30 μm in thickness was accommodated as a separator, a positive electrode mixture was arranged on this separator, and a tungsten positive electrode current collector was arranged further on the positive electrode mixture. In succession, after an electrolyte was poured in, a metal positive electrode container of cylindrical form with a bottom was fixed to this container by way of an insulating gasket, thereby assembling a coin type battery of 20 mm in diameter and 1.6 mm in thickness.

The material of the insulating gasket was silicone rubber having a He gas permeability at 30° C. of $230 \times 10^{-10}$ ($cm^3$(STP)cm/sec·$cm^2$·cmHg), and a tensile strength at room temperature of 6 MPa. The insulating gasket was shaped like a ring, with a thickness of 200 μm.

In the obtained battery, the electromotive force, and the battery capacity by discharging until a voltage of 0.65 V at 0.1 mA were measured.

EXAMPLE 20 TO 30 COMPARATIVE EXAMPLES 5 AND 6

Aluminum negative electrode batteries were fabricated in the same procedure as in Example 19, except that the materials of the negative electrode and negative electrode gasket were varied as shown in Table 3.

In the obtained batteries of Examples 20 to 30 and Comparative examples of 5 and 6, the electromotive force, and the battery capacity by discharging until a voltage of 0.65 V by constant current discharge at 0.1 mA were measured, and results as shown in Table 4 were obtained. The battery weight was also measured, results are shown also in Table 4. As the ethylene fluoride-propylene copolymer, Teflon FEP (registered trademark) was used.

TABLE 3

|  | Gasket material | Gas permeability in 30° C. and He gas ($10^{-10}$ $cm^3$ (STP) cm/sec · $cm^2$ · cmHg) | Tensile strength (MPa) | Thickness of organic gasket (μm) | Negative electrode material |
|---|---|---|---|---|---|
| Example 19 | Silicone rubber | 230 | 6 | 200 | 4N—Al |
| Example 20 | Natural rubber | 35 | 15 | 200 | 4N—Al |
| Example 21 | Polyvinyl acetate | 3 | 20 | 200 | 4N—Al |
| Example 22 | Butyl rubber | 5 | 15 | 200 | 4N—Al |
| Example 23 | Polycarbonate | 65 | 60 | 200 | 4N—Al |
| Example 24 | Teflon FEP | 62 | 26 | 200 | 4N—Al |

TABLE 3-continued

| | Gasket material | Gas permeability in 30° C. and He gas ($10^{-10}$ cm³ (STP) cm/sec · cm² · cmHg) | Tensile strength (MPa) | Thickness of organic gasket (μm) | Negative electrode material |
|---|---|---|---|---|---|
| Example 25 | Polystyrene | 35 | 35 | 200 | Mn1.5%—Al98.5% alloy |
| Example 26 | Silicone rubber | 230 | 6 | 200 | Mg5%—Al95% alloy |
| Example 27 | Silicone rubber | 230 | 6 | 200 | Pb0.05%—Al99.95% alloy |
| Example 28 | Silicone rubber | 230 | 6 | 200 | Mg2%—Cr3.5%—Al94.5% alloy |
| Example 29 | Silicone rubber | 230 | 6 | 200 | In0.05%—Mn5%—Al94.5% alloy |
| Example 30 | Silicone rubber | 230 | 6 | 200 | Ca0.05%—Mn5%—Al94.5% |
| Comparative Example 5 | Nylon 6 | 0.6 | 60 | 200 | Sn0.5%—Mn5%—Al94.5% |
| Comparative Example 6 | Polyethylene | 1.5 | 31 | 200 | 4N—Al |

TABLE 4

| | Electromotive force (V) | Capacity (mAh) | Weight (g) |
|---|---|---|---|
| Example 19 | 1.84 | 50 | 2.1 |
| Example 20 | 1.86 | 52 | 2 |
| Example 21 | 1.87 | 50 | 2.1 |
| Example 22 | 1.86 | 56 | 2.1 |
| Example 23 | 1.88 | 51 | 2 |
| Example 24 | 1.87 | 55 | 2 |
| Example 25 | 1.86 | 53 | 2.1 |
| Example 26 | 1.82 | 43 | 2 |
| Example 27 | 1.82 | 46 | 2 |
| Example 28 | 1.8 | 48 | 2.1 |
| Example 29 | 1.86 | 50 | 2 |
| Example 30 | 1.86 | 48 | 2.1 |
| Comparative Example 5 | 1.81 | 15 | 2.1 |
| Comparative Example 6 | 1.83 | 20 | 2 |

As clear from Table 3 and Table 4, the batteries of Examples 19 to 30 comprising insulating gaskets containing a hydrogen gas permeable organic material of which He gas permeability at 30° C. is $2 \times 10^{-10}$ (cm³(STP)cm/sec·cm²·cmHg) or more are higher in discharge capacity as compared with batteries of Comparative examples 5 and 6 comprising insulating gaskets containing a hydrogen gas permeable organic material of which gas permeability is less than $2 \times 10^{-10}$ (cm³(STP)cm/sec·cm²·cmHg).

EXAMPLE 31

An aluminum negative electrode battery having a manganese dry cell structure as shown in FIG. 4 was manufactured in the following procedure.

10 parts by weight of electrolytic manganese dioxide and 1 part by weight of acetylene black were mixed. 15 parts by weight of an electrolyte, which is an aqueous solution containing 1.5 M/L of $AlCl_3$, 0.1 M/L of 2,2-bipyridyl, 0.2 M/L of $Al(NO_3)_3$ and 0.75 M/L of KCl, was added to the mixture, thereby obtaining a positive electrode mixture.

A separator and a bottom paper were set in a negative electrode can, made of aluminum with a purity of 99.99%, of cylindrical form with a bottom with 0.3 mm in thickness. This negative electrode case was filled with 9.5 g of the positive electrode mixture, a brim paper was arranged on the positive electrode mixture, and then a positive electrode current collector rod made of carbon was inserted. Sequentially, after a wax layer was arranged on the brim paper and an insulating washer was set in place, a negative electrode terminal and insulating washer were fixed to the negative electrode can by a heat shrink tube. Further, an insulating ring was arranged, a positive electrode terminal was put on a current collector rod, and an aluminum negative electrode battery of 14 mm in diameter and 50 mm in overall height was assembled.

The material of the insulating washer was polystyrene having a He gas permeability at 30° C. of $17 \times 10^{-10}$ (cm³ (STP)cm/sec·cm²·cmHg), and a tensile strength at room temperature of 35 MPa. The thickness t of the thinnest portion formed by a cutting in a bowl-shaped notch was 140 μm.

In the obtained battery, when the electromotive force, and the battery capacity by discharging until a voltage of 0.65 V by constant current discharge at 100 mA were measured, the electromotive force was 1.86 V and the capacity was 1330 mAh, and both a high voltage and large capacity were obtained, while the weight was only 13.5 g.

EXAMPLES 32 TO 50 COMPARATIVE EXAMPLES 7 AND 8

Aluminum negative electrode batteries were fabricated in the same procedure as in Example 31, except that the materials of the negative electrode and negative electrode gasket and the thickness of the negative electrode gasket were varied as shown in Table 5.

COMPARATIVE EXAMPLE 9

A zinc manganese battery was prepared in the same procedure as in Example 31, except that zinc was used as the negative electrode active material and 1 M/L aqueous solution of zinc chloride was used as the electrolyte.

COMPARATIVE EXAMPLE 10

A zinc manganese battery was prepared in the same procedure as in Comparative example 9, except that the material of the negative electrode gasket and the thickness of the organic gasket were changed as shown in Table 5.

In the obtained batteries of Examples 32 to 50 and Comparative examples of 7 to 10, the electromotive force, and the battery capacity by discharging until a voltage of 0.65 V by a constant current discharge at 100 mA were measured, and the results as shown in Table 6 were obtained. The battery weight was also measured, and results are shown also in Table 6.

The aluminum alloy in Table 6 was prepared by using 4N-Al and additive elements. In the table, the low density polyethylene refers to a density of 0.91 to 0.93 $g/cm^3$, and the high density polyethylene refers to a density of 0.94 to 0.96 $g/cm^3$. As the ethylene fluoride-propylene copolymer, Teflon FEP (registered trademark) was used.

TABLE 5

| | Gasket material | Gas permeability in 30° C. and He gas ($10^{-10}$ $cm^3$ (STP) cm/sec · $cm^2$ · cmHg) | Tensile strength (MPa) | Thickness of organic gasket (μm) | Negative electrode material |
|---|---|---|---|---|---|
| Example 31 | Polystyrene | 17 | 35 | 140 | 4N—Al |
| Example 32 | Polycarbonate | 19 | 60 | 10 | 5N—Al |
| Example 33 | Cellulose acetate | 14 | 42 | 120 | 6N—Al |
| Example 34 | Ethyl cellulose | 30 | 32 | 160 | 7N—Al |
| Example 35 | Ethylene-vinyl acetate copolaymer | 20 | 70 | 75 | 8N—Al |
| Example 36 | Low density polyethylene | 5 | 20 | 250 | 9N—Al |
| Example 37 | Teflon FEP | 62 | 26 | 200 | Mg5%—Al95% alloy |
| Example 38 | Teflon FEP | 62 | 26 | 200 | Pb0.05%—Al99.05% alloy |
| Example 39 | Teflon FEP | 62 | 26 | 200 | Mg2%—Cr3.5%—Al94.5% alloy |
| Example 40 | Teflon FEP | 62 | 26 | 200 | In0.05%—Mn5%—Al94.5% alloy |
| Example 41 | Teflon FEP | 62 | 26 | 200 | Ca0.05%—Mn5%—Al94.5% alloy |
| Example 42 | Teflon FEP | 62 | 26 | 200 | Sn0.05%—Mn5%—Al94.5% alloy |
| Example 43 | Teflon FEP | 62 | 26 | 200 | Mn1.5%—Al98.5% alloy |
| Example 44 | Teflon FEP | 62 | 26 | 200 | Zn0.5%—Pb2%—Al97.5% alloy |
| Example 45 | Polystyrene | 17 | 35 | 140 | Pb0.05%—Al99.05% alloy |
| Example 46 | Polystyrene | 17 | 35 | 140 | Mg5%—Al95% alloy |
| Example 47 | Polystyrene | 17 | 35 | 140 | Mg2%—Cr3.5%—Al94.5% alloy |
| Example 48 | Polystyrene | 17 | 35 | 140 | In0.05%—Mn5%—Al94.5% alloy |
| Example 49 | Polystyrene | 17 | 35 | 140 | Ca0.05%—Mn5%—Al94.5% alloy |
| Example 50 | Polystyrene | 17 | 35 | 140 | Sn0.05%—Mn5%—Al94.5% alloy |
| Comparative Example 7 | Nylon 6 | 0.6 | 60 | 85 | 4N—Al |
| Comparative Example 8 | High density polyethylene | 1.5 | 31 | 160 | Mn1.5%—Al98.5% alloy |
| Comparative Example 9 | Polystyrene | 17 | 35 | 140 | 3N—Zn |
| Comparative Example 10 | High density polyethylene | 1.5 | 31 | 160 | 3N—Zn |

TABLE 6

| | Electromotive force (V) | Capacity (mAh) | Weight (g) |
|---|---|---|---|
| Example 31 | 1.86 | 1330 | 13.5 |
| Example 32 | 1.87 | 1290 | 13.4 |
| Example 33 | 1.86 | 1300 | 13.5 |
| Example 34 | 1.88 | 1320 | 13.5 |
| Example 35 | 1.86 | 1330 | 13.4 |
| Example 36 | 1.86 | 1260 | 13.5 |
| Example 37 | 1.82 | 1350 | 13.5 |
| Example 38 | 1.81 | 1360 | 13.5 |
| Example 39 | 1.81 | 1340 | 13.4 |
| Example 40 | 1.85 | 1340 | 13.5 |
| Example 41 | 1.85 | 1320 | 13.5 |
| Example 42 | 1.80 | 1330 | 13.4 |
| Example 43 | 1.85 | 1340 | 13.5 |
| Example 44 | 1.84 | 1320 | 13.5 |
| Example 45 | 1.82 | 1250 | 13.4 |
| Example 46 | 1.82 | 1280 | 13.5 |
| Example 47 | 1.81 | 1260 | 13.5 |
| Example 48 | 1.86 | 1260 | 13.4 |
| Example 49 | 1.84 | 1280 | 13.4 |
| Example 50 | 1.81 | 1280 | 13.5 |
| Comparative Example 7 | 1.86 | 960 | 13.5 |
| Comparative Example 8 | 1.86 | 1010 | 13.5 |
| Comparative Example 9 | 1.65 | 700 | 19.8 |
| Comparative Example 10 | 1.64 | 695 | 20 |

As clear from Table 5 and Table 6, the batteries of Examples 31 to 50 comprising insulating washers containing a hydrogen gas permeable organic material of which He gas permeability at 30° C. is $2 \times 10^{-10}$ (cm$^3$(STP)cm/sec·cm$^2$·cmHg) or more are higher in discharge capacity as compared with batteries of Comparative examples 7 and 8 comprising insulating washers containing a hydrogen gas permeable organic material of which gas permeability is less than $2 \times 10^{-10}$ (cm$^3$(STP)cm/sec·cm$^2$·cmHg).

Compared with the batteries in Comparative examples 9 and 10, if Zn is used as the negative electrode active material, it is understood that the discharge capacity is not expected to be improved substantially even if the insulating washer contains a hydrogen gas permeable organic material of which He gas permeability at 30° C. is $2 \times 10^{-10}$ (cm$^3$(STP) cm/sec·cm$^2$·cmHg) or more.

EXAMPLE 51

An aluminum negative electrode battery of an alkaline dry cell structure as shown in FIG. 5 was manufactured in the method explained below.

<Preparation of Positive Electrode>

Using electrolytic manganese dioxide (MnO$_2$) as positive electrode active material, 10 wt. % of acetylene black as conductive agent and 3 wt. % of polytetrafluoroethylene as binder were added and mixed in this positive electrode active material, and then pressed and formed in a cylindrical form to prepare a positive electrode mixture. A carbon film of carbon fiber of 100 μm in thickness was prepared as a positive electrode current collector.

<Preparation of Electrolyte>

An aqueous solution was prepared by mixing 1 M/L of AlCl$_3$, 0.1 M/L of 2,2-bipyridyl, 0.5 M/L of KCl, and 0.2 M/L of Al(NO$_3$)$_3$.

<Preparation of Negative Electrode>

After mixing 95 wt. % of aluminum powder with a purity of 99.99% (4N) and 4 wt. % of acrylic acid polymer as thickener, an electrolyte was added to prepare a negative electrode gel. A metal rod of stainless steel was prepared as a negative electrode current collector.

<Water Repellent Organic Polymer Sheet with Gas Permeability>

A sheet of ethylene fluoride-propylene copolymer having a He gas permeability at 30° C. of $2 \times 10^{-6}$ (cm$^3$ (STP)cm/sec·cm$^2$·cmHg), a water repellence of 18 kPa, and a thickness of 0.54 mm was prepared. The He gas permeability at 30° C. of the ethylene fluoride-propylene copolymer forming this sheet was $62 \times 10^{-10}$ (cm$^3$(STP) cm/sec·cm$^2$·cmHg). This sheet can be used as a filter.

<Assembling of Battery>

In the power generating element case 12a of cylindrical form with a bottom, the positive electrode current collector, the cylindrical positive electrode mixture 11, and the glass fiber separator 9 of 30 μm in thickness were arranged, and the separator 9 was filled with the negative electrode gel 10. Thereafter, an electrolyte was poured into the positive electrode mixture 11, separator 9, and negative electrode gel 10. Further, the negative electrode current collector 7 was inserted into the negative electrode gel 10, and the water repellent organic polymer sheet 15 as a water repellent member was fixed between the inner surface of the power generating element case 12a and the support 4a of the negative electrode gasket 4 by the impact resilience of the negative electrode gasket 4. At this time, the air chamber 16 of a volume equivalent to 4% of the inner volume of the power generating element case 12a was provided between the power generating element and the water repellent organic polymer sheet 15. In succession, by processing the sealing by using the bottom plate 2 serving also as a negative electrode terminal, the sealing plate 13 serving also as a positive electrode terminal, and the polypropylene outer casing 1, the cylindrical aluminum negative electrode battery having the structure as shown in FIG. 5, and 14 mm in diameter and 50 mm in overall height was fabricated.

EXAMPLE 52

An aluminum negative electrode battery was fabricated in the same manner as in Example 51, except that two gas permeable water repellent organic polymer sheets same as shown in Example 51 were prepared and arranged as shown in FIG. 6. At this time, the air chamber 16 of a volume equivalent to 4% of the inner volume of the power generating element case 12a was provided between the water repellent organic polymer sheet 15b closer to the power generating element and the power generating element. The gap X between the water repellent organic polymer sheets was 1 mm. The number of water repellent organic polymer sheets to be provided is indicated by the numerical value in the column of number of sheets in Table 7.

EXAMPLES 53 TO 64

Aluminum negative electrode batteries of same structure as in Example 51 were fabricated, except that the He gas permeability of water repellent organic polymer sheet at 30° C., water repellence, base material, He gas permeability of the base material at 30° C., number of sheets, volume of the air chamber, and negative electrode material were set as shown in Table 7. Each of the water repellent organic polymer sheets used in Examples 53 to 64 can be used as a filter.

EXAMPLE 65

An aluminum negative electrode battery was fabricated in the same manner as in Example 51, except that the gas permeable water repellent organic polymer sheet used in Example 51 was arranged between the negative electrode gasket 4 and the washer 8.

COMPARATIVE EXAMPLES 11 TO 13

Aluminum negative electrode batteries were fabricated in the same manner as in Example 51, except that the He gas permeability of water repellent organic polymer sheet at 30° C., water repellence, base material, He gas permeability of the base material at 30° C., number of sheets, volume of the air chamber, and negative electrode material were set as shown in Table 7.

COMPARATIVE EXAMPLE 14

A zinc manganese battery was prepared in the same manner as in Example 51, except that zinc was used as the negative electrode active material, and that 1 M/L of zinc chloride aqueous solution was used as the electrolyte.

COMPARATIVE EXAMPLE 15

A zinc manganese battery was prepared in the same manner as in Comparative example 14, except that the water repellent organic polymer sheet used in Comparative example 13 was used.

In the obtained batteries of Examples 51 to 65 and Comparative examples of 11 to 15, the electromotive force, and the battery capacity by discharging until a voltage of 0.65 V by constant current discharge at 100 mA were measured, and results are shown in Table 8. The battery weight was also measured, results are shown also in Table 8. In each example, 100 cells were fabricated, and the number of cells causing liquid leaks when discharged until 0.3 V was investigated, and the results are also shown in Table 8. To check for liquid leaks, the battery weight was measured before and after discharge, and loss of battery weight of by 0.1 g or more was judged to be a leak. The battery in Example 1 described above was also tested for liquid leak, and the result is shown together in Table 8.

In Table 7, all aluminum alloys were prepared by using 4N-Al and additive elements.

TABLE 7

| | Water repellent organic polymer sheet | | | Gas permeability of the base material in 30° C. and He gas ($10^{-10}$ cm$^3$ (STP) cm/ sec · cm$^2$ · cmHg) | Number of sheets | Rate of air chamber between power generating elements and water repellent organic polymer sheet (%) (inner volume of battery case being 100%) | Negative electrode material |
|---|---|---|---|---|---|---|---|
| | Gas permeability in 30° C. and He gas ($10^{-6}$ cm$^3$ (STP) cm/ sec · cm$^2$ · cmHg) | Water repellence (kPa) | Base material | | | | |
| Example 51 | 2 | 18 | Teflon FEP | 62 | 1 | 4 | 4N—Al |
| Example 52 | 2 | 18 | Teflon FEP | 62 | 2 | 4 | 4N—Al |
| Example 53 | 5 | 5 | Polystyrene | 35 | 1 | 4 | 4N—Al |
| Example 54 | 12 | 3 | Polycarbonate | 65 | 1 | 4 | 4N—Al |
| Example 55 | 25 | 3 | Cellulose acetate | 14 | 1 | 4 | 4N—Al |
| Example 56 | 30 | 4.5 | Ethyl cellulose | 30 | 1 | 4 | 4N—Al |
| Example 57 | 200 | 2.2 | Low density polyethylene | 5 | 1 | 4 | 5% Zn—95% Al alloy |
| Example 58 | 350 | 2.1 | Nylon 6 | 0.6 | 1 | 4 | 4N—Al |
| Example 59 | 2 | 18 | Teflon FEP | 62 | 1 | 0 | 4N—Al |
| Example 60 | 2 | 18 | Teflon FEP | 62 | 1 | 2 | 4N—Al |
| Example 61 | 2 | 18 | Teflon FEP | 62 | 1 | 5 | 4N—Al |
| Example 62 | 2 | 18 | Teflon FEP | 62 | 1 | 10 | 4N—Al |
| Example 63 | 2 | 18 | Teflon FEP | 62 | 1 | 20 | 4N—Al |
| Example 64 | 2 | 18 | Teflon FEP | 62 | 1 | 30 | 4N—Al |
| Example 65 | 2 | 18 | Teflon FEP | 62 | 1 | — | 4N—Al |
| Comparative Example 11 | 10000 | 0.1 | Teflon FEP | 62 | 1 | 4 | 4N—Al |
| Comparative Example 12 | 0.0013 | 75 | Nylon 6 | 0.6 | 1 | 4 | 4N—Al |
| Comparative Example 13 | 0.0031 | 435 | Polystyrene | 35 | 1 | 4 | 4N—Al |
| Comparative Example 14 | 2 | 18 | Teflon FEP | 62 | 1 | 4 | 4N—Zn |
| Comparative Example 15 | 0.0031 | 435 | Polystyrene | 35 | 1 | 4 | 4N—Zn |

TABLE 8

| | Electromotive force (V) | Capacity (mAh) | Weight (g) | Number of leaks (in 100 cells) |
|---|---|---|---|---|
| Example 51 | 1.86 | 2870 | 18 | 2 |
| Example 52 | 1.86 | 2890 | 18 | 0 |
| Example 53 | 1.86 | 2760 | 18 | 7 |
| Example 54 | 1.87 | 2770 | 18 | 5 |
| Example 55 | 1.87 | 2780 | 18 | 4 |
| Example 56 | 1.88 | 2750 | 18.1 | 8 |
| Example 57 | 1.89 | 2820 | 18 | 5 |
| Example 58 | 1.82 | 2690 | 18.1 | 7 |
| Example 59 | 1.86 | 2740 | 18 | 4 |
| Example 60 | 1.86 | 2790 | 18 | 2 |
| Example 61 | 1.86 | 2815 | 18 | 1 |
| Example 62 | 1.86 | 2825 | 18 | 1 |
| Example 63 | 1.86 | 2720 | 18 | 5 |
| Example 64 | 1.86 | 2700 | 18 | 6 |
| Example 65 | 1.85 | 2700 | 18.1 | 10 |
| Example 1 | 1.86 | 2800 | 18 | 12 |
| Comparative Example 11 | 1.87 | 1890 | 18.2 | 42 |
| Comparative Example 12 | 1.88 | 1770 | 18.2 | 5 |
| Comparative Example 13 | 1.86 | 1640 | 18 | 8 |
| Comparative Example 14 | 1.64 | 1630 | 21.4 | 11 |
| Comparative Example 15 | 1.63 | 1600 | 21.5 | 12 |

As is clear from Table 7 and Table 8, the batteries of Examples 51 to 64 comprising hydrogen gas permeable sheets of which He gas permeability at 30° C. is $2\times10^{-6}$ to $10000\times10^{-6}$ ($cm^3$(STP) cm/sec·$cm^2$·cmHg) and water repellence of 2 kPa or more are high in discharge capacity and low in the number of leaks.

By contrast, the battery of Comparative example 11 comprising a hydrogen gas permeable sheet of which water repellence is less than 2 kPa is lower in the discharge capacity and higher in the number of leaks as compared with those of Examples 51 to 64. On the other hand, the batteries of Comparative examples 12 and 13 comprising the hydrogen gas permeable sheet of which He gas permeability at 30° C. is less than $2\times10^{-6}$ ($cm^3$(STP)cm/sec·$cm^2$·cmHg) were lower in the discharge capacity as compared with those of Examples 51 to 64.

Compared with the batteries in Comparative examples 14 and 15, if Zn is used as the negative electrode active material, it is understood that the discharge capacity is not expected to be improved substantially even by using a hydrogen gas permeable sheet of which He gas permeability is $2\times10^{-6}$ to $10000\times10^{-6}$ ($cm^3$(STP)cm/sec·$cm^2$·cmHg) and water repellence is 2 kPa or more.

Note that, in the battery of Example 65 in which the hydrogen gas permeable sheet is arranged between the negative electrode gasket and the washer, and the battery of Example 1 using the negative electrode gasket containing the organic material of which He gas permeability at 30° C. is $2\times10^{-10}$ ($cm^3$(STP) cm/sec·$cm^2$·cmHg) or more, the number of leaks was larger than in Examples 51 to 64.

As can be seen from Table 8, the liquid leak resistance is enhanced by overlaying a plurality of hydrogen gas permeable sheets, and the volume of the air chamber between the hydrogen gas permeable sheet and the power generating element is most preferable at 1 to 10% of the inner volume of the power generating element case (battery case) from the viewpoint of satisfying both discharge capacity and liquid leak resistance.

EXAMPLE 66

An aluminum negative electrode battery having a manganese cell structure as shown in FIG. 7 was manufactured in the following procedure.

Electrolytic manganese dioxide as the positive electrode active material, acetylene black as conductive agent, and a mixed aqueous solution of 1 M of $AlCl_3$, 0.1 M of 2,2-bipyridyl, 0.5 M/L of KCl, and 0.2 M/L of $Al(NO_3)_3$ as electrolyte, they were mixed at a ratio by weight of 20:2:15, and a positive electrode mixture was prepared.

The separator 32 and the bottom paper 33 were set in the negative electrode can 31 of a cylindrical shape with a bottom of 0.3 mm in thickness, made of aluminum with purity of 99.99%. This negative electrode can 31 was filled with 9.5 g of the positive electrode mixture 34, and the water repellent organic polymer sheet 46 same as explained in Example 51 was arranged so that the volume of the second air chamber 41b provided between the positive electrode mixture 34 and the water repellent organic polymer sheet 46 may be equivalent to 4% of the inner volume of the negative electrode can 31. The positive electrode current collector rod 40 was inserted in the positive electrode mixture 34, the water repellent organic polymer sheet 46 was arranged as water repellent member, the insulating washer 37 was set in place, and the insulating washer 37 was fixed to the negative electrode can 31 by means of the heat shrink tube 39. In succession, after providing the insulating ring 44, the positive electrode terminal plate 43 was put on the current collector 40, and an aluminum negative electrode battery of 14 mm in diameter and 50 mm in overall height was fabricated.

EXAMPLE 67

An aluminum negative electrode battery was fabricated in the same manner as in Example 66, except that two gas permeable water repellent organic polymer sheets same as shown in Example 51 were prepared and arranged as shown in FIG. 8. At this time, the second air chamber 41b between the water repellent organic polymer sheet 46a closer to the power generating element and the power generating element was set in a volume equivalent to 4% of the inner volume of the negative electrode can 31. The gap between the water repellent organic polymer sheets 46a, 46b was 1 mm. The number of water repellent organic polymer sheets to be arranged is indicated by the numerical value in the column of number of sheets in Table 9.

EXAMPLES 68 TO 79 COMPARATIVE EXAMPLES 16 TO 18

Aluminum negative electrode batteries of same structure as in Example 66 were fabricated, except that the He gas permeability of the water repellent organic polymer sheet at 30° C., water repellence, base material, He gas permeability of the base material at 30° C., number of sheets, volume of second air chamber, and negative electrode material were set as shown in Table 9.

COMPARATIVE EXAMPLE 19

A zinc manganese battery was prepared in the same manner as in Example 66, except that zinc was used as the negative electrode active material, and that 1 M/L of zinc chloride aqueous solution was used as the electrolyte.

COMPARATIVE EXAMPLE 20

A zinc manganese battery was prepared in the same manner as in Comparative example 19, except that the gas permeable water repellent organic polymer sheet used in Comparative example 18 was used.

In the obtained batteries of Examples 66 to 79 and Comparative examples 16 to 20, the electromotive force, and the battery capacity by discharging until a voltage of 0.65 V by constant current discharge at 100 mA were measured, and results are shown in Table 10. The battery weight was also measured, and results are shown also in Table 10. In each example, 100 cells were fabricated, and the number of cells causing liquid leaks was investigated, and the results are also shown in Table 10. The battery in Example 31 was also tested for liquid leak, and the results are shown together in Table 10.

In Table 9, all aluminum alloys were prepared by using 4N-Al and additive elements.

TABLE 10

| | Electromotive force (V) | Capacity (mAh) | Weight (g) | Number of leaks (in 100 cells) |
|---|---|---|---|---|
| Example 66 | 1.87 | 1380 | 13.5 | 1 |
| Example 67 | 1.86 | 1400 | 13.6 | 0 |
| Example 68 | 1.86 | 1350 | 13.5 | 6 |
| Example 69 | 1.85 | 1345 | 13.4 | 4 |
| Example 70 | 1.84 | 1360 | 13.5 | 4 |
| Example 71 | 1.86 | 1320 | 13.5 | 8 |
| Example 72 | 1.87 | 1355 | 13.4 | 5 |
| Example 73 | 1.87 | 1315 | 13.4 | 3 |
| Example 74 | 1.86 | 1315 | 13.5 | 4 |
| Example 75 | 1.85 | 1340 | 13.5 | 1 |
| Example 76 | 1.84 | 1360 | 13.4 | 2 |
| Example 77 | 1.86 | 1370 | 13.5 | 2 |
| Example 78 | 1.86 | 1310 | 13.4 | 5 |
| Example 79 | 1.86 | 1300 | 13.4 | 5 |
| Example 31 | 1.86 | 1330 | 13.5 | 11 |
| Comparative Example 16 | 1.85 | 1010 | 13.4 | 45 |
| Comparative Example 17 | 1.88 | 980 | 13.5 | 3 |
| Comparative Example 18 | 1.86 | 1000 | 13.5 | 2 |
| Comparative Example 19 | 1.62 | 720 | 21.4 | 10 |
| Comparative Example 20 | 1.63 | 715 | 21.5 | 11 |

TABLE 9

| | Water repellent organic polymer sheet | | | Gas permeability of the base material in 30° C. and He gas ($10^{-10}$ cm³ (STP) cm/ sec · cm² · cmHg) | Number of sheets | Rate of air chamber between power generating elements and water repellent organic polymer sheet (%) (inner volume of battery case being 100%) | Negative electrode material |
|---|---|---|---|---|---|---|---|
| | Gas permeability in 30° C. and He gas ($10^{-6}$ cm³ (STP) cm/ sec · cm² · cmHg) | Water repellence (kPa) | Base material | | | | |
| Example 66 | 2 | 18 | Teflon FEP | 62 | 1 | 4 | 4N—Al |
| Example 67 | 2 | 18 | Teflon FEP | 62 | 2 | 4 | 4N—Al |
| Example 68 | 5 | 5 | Polystyrene | 35 | 1 | 4 | 4N—Al |
| Example 69 | 12 | 3 | Polycarbonate | 65 | 1 | 4 | 4N—Al |
| Example 70 | 25 | 3 | Cellulose acetate | 14 | 1 | 4 | 4N—Al |
| Example 71 | 30 | 4.5 | Ethyl cellulose | 30 | 1 | 4 | 4N—Al |
| Example 72 | 200 | 2.2 | Low density polyethylene | 5 | 1 | 4 | 5% Zn—95% Al alloy |
| Example 73 | 350 | 2.1 | Nylon 6 | 0.6 | 1 | 4 | 4N—Al |
| Example 74 | 2 | 18 | Teflon FEP | 62 | 1 | 0 | 4N—Al |
| Example 75 | 2 | 18 | Teflon FEP | 62 | 1 | 2 | 4N—Al |
| Example 76 | 2 | 18 | Teflon FEP | 62 | 1 | 5 | 4N—Al |
| Example 77 | 2 | 18 | Teflon FEP | 62 | 1 | 10 | 4N—Al |
| Example 78 | 2 | 18 | Teflon FEP | 62 | 1 | 20 | 4N—Al |
| Example 79 | 2 | 18 | Teflon FEP | 62 | 1 | 30 | 4N—Al |
| Comparative Example 16 | 10000 | 0.1 | Teflon FEP | 62 | 1 | 4 | 4N—Al |
| Comparative Example 17 | 0.0013 | 75 | Nylon 6 | 0.6 | 1 | 4 | 4N—Al |
| Comparative Example 18 | 0.0031 | 435 | Polystyrene | 35 | 1 | 4 | 4N—Al |
| Comparative Example 19 | 2 | 18 | Teflon FEP | 62 | 1 | 4 | 4N—Zn |
| Comparative Example 20 | 0.0031 | 435 | Polystyrene | 35 | 1 | 4 | 4N—Zn |

As is clear from Table 9 and Table 10, the batteries of Examples 66 to 79 comprising hydrogen gas permeable sheets of which He gas permeability at 30° C. is in a range of $2 \times 10^{-6}$ to $10000 \times 10^{-6}$ ($cm^3$(STP) cm/sec·$cm^2$·cmHg) and water repellence of 2 kPa or more are high in discharge capacity and low in the number of leaks.

By contrast, the battery of Comparative example 16 comprising a hydrogen gas permeable sheet of which water repellence is less than 2 kPa is lower in the discharge capacity and higher in the number of leaks as compared with those of Examples 66 to 79. On the other hand, the batteries of Comparative examples 17 and 18 comprising the hydrogen gas permeable sheet of which He gas permeability at 30° C. is less than $2 \times 10^{-6}$ ($cm^3$(STP)cm/sec·$cm^2$·cmHg) were lower in the discharge capacity as compared with those of Examples 66 to 79.

Compared with the batteries in Comparative examples 19 and 20, if Zn is used as the negative electrode active material, it is understood that the discharge capacity is not expected to be improved substantially even by using a hydrogen gas permeable sheet of which gas permeability is in a range of $2 \times 10^{-6}$ to $10000 \times 10^{-6}$ ($cm^3$(STP)cm/ sec·$cm^2$·cmHg) and water repellence is 2 kPa or more.

In the battery of Example 31 using the insulating washer containing the organic material of which He gas permeability at 30° C. is $2 \times 10^{-10}$ ($cm^3$(STP) cm/sec·$cm^2$·cmHg) or more, the number of leaks was larger than in Examples 66 to 79.

As further known from Table 10, the liquid leak resistance is enhanced by overlaying a plurality of hydrogen gas permeable sheets, and the volume of the air chamber between the hydrogen gas permeable sheet and the power generating element is most preferable at 1 to 10% of the inner volume of the negative electrode can from the viewpoint of satisfying both discharge capacity and liquid leak resistance.

EXAMPLE 80

The aluminum negative electrode battery of an alkaline dry cell structure as shown in FIG. 10 was manufactured in the method explained below.

<Preparation of Positive Electrode>

Using electrolytic manganese dioxide ($MnO_2$) as a positive electrode active material, 10 wt. % of acetylene black as a conductive agent and 3 wt. % of polytetrafluoroethylene as a binder were added and mixed in this positive electrode active material, and pressed and formed in a cylindrical form to prepare a positive electrode mixture. A carbon film of carbon fiber with the thickness of 100 µm was prepared as a positive electrode current collector.

<Preparation of Aqueous Electrolyte>

An aqueous solution was prepared by mixing 1 M/L of $AlCl_3$, 0.1 M/L of 2,2-bipyridyl, 0.5 M/L of KCl, and 0.2 M/L of $Al(NO_3)_3$, and an aqueous electrolyte was obtained.

<Preparation of Negative Electrode>

95 wt. % of aluminum powder with a purity of 99.99% (4N) and 4 wt. % of acrylic acid polymer as a thickener were mixed. The electrolyte was added to the mixture, thereby obtaining a negative electrode gel. A metal rod of tungsten was prepared as a negative electrode current collector.

<Separator>

A bag-shaped hydrophobic separator was prepared by using a polypropylene nonwoven fabric having the air permeability, thickness, contact angle for water, and METSUKE as specified in Table 11. In this separator, since the contact angle of the inner surface and the contact angle of the outer surface are equal to each other, the contact angle shown in Table 11 refers to both contact angles of the inner and outer surfaces. The air permeability, thickness and contact angle were measured in the methods described above.

<Assembling of Battery>

In a positive electrode can of cylindrical form with a bottom, a cylindrical positive electrode mixture and a bag-shaped separator were arranged, and a space provided by the separator was filled with a negative electrode gel. The separator surface contacting with the negative electrode gel is a first hydrophobic surface. On the other hand, the separator surface contacting with the inner circumferential surface of the positive electrode mixture is a second hydrophobic surface. Successively, the electrolyte was poured into the positive electrode mixture, separator and negative electrode gel. Next, after a negative electrode current collector was inserted into the negative electrode gel, the sealing process was performed by using a negative electrode gasket made of silicone rubber, the bottom plate serving also as a negative electrode terminal, the sealing plate serving also as a positive electrode terminal and the polypropylene outer casing, thereby obtaining a cylindrical aluminum negative electrode battery having the structure as shown in FIG. 10, and measuring 14 mm in diameter and 50 mm in overall height.

In the obtained battery, the electromotive force, and the battery capacity by discharging until a voltage of 0.65 V by constant current discharge at 100 mA were measured, and the electromotive force was 1.87 V and the capacity was 1875 mAh, and both high voltage and large capacity were obtained, while the weight was only 18 g.

EXAMPLES 81 TO 103 COMPARATIVE EXAMPLES 21 AND 22

Aluminum negative electrode batteries were fabricated in the same procedure as in Example 80, except that the material of the negative electrode active material, material of the separator, air permeability, thickness, contact angle, and METSUKE were set as shown in Table 11.

In the obtained batteries of Examples 80 to 103 and Comparative examples 21 and 22, the electromotive force, and the battery capacity by discharging until a voltage of 0.65 V by constant current discharge at 100 mA were measured, and results as shown in Table 12 were obtained. The battery weight was also measured, and results are shown also in Table 12. In each example, 100 cells were fabricated, and the number of cells causing liquid leaks when discharged until 0.3V was investigated, and the results are also shown in Table 12. To check for liquid leaks, loss of battery weight by 0.1 g or more before and after discharge was determined to be a leak, and if less than 0.1 g, it was determined to free from leak. At the same time, in 100 cells of each example, the difference in electromotive force before and after 10-days standing test at 45° C. was measured, and short-circuiting was determined at 0.4 V or more, and it was determined free from short-circuiting if less than 0.4 V, and the results are also shown in Table 12.

In Table 11, all aluminum alloys were prepared by using 4N-Al and additive elements.

TABLE 11

|  | Separator material | Air permeability (sec/100 mL) | Thickness (μm) | Contact angle (deg) | METSUKE (g/m2) | Negative electrode active material |
|---|---|---|---|---|---|---|
| Example 80 | Polypropylene nonwoven fabric | 2.5 | 40 | 100 | 40 | 4N—Al |
| Example 81 | Polyethylene nonwoven fabric | 4.2 | 45 | 94 | 30 | 4N—Al |
| Example 82 | Polystyrene porous film | 6.3 | 50 | 91 | 50 | 4N—Al |
| Example 83 | Acetyl cellulose porous film | 5.5 | 42 | 60 | 50 | 4N—Al |
| Example 84 | Ethyl cellulose porous film | 7.1 | 32 | 65 | 50 | 4N—Al |
| Example 85 | Teflon coated kraft paper | 4.5 | 50 | 108 | 40 | 4N—Al |
| Example 86 | Teflon coated glass fiber sheet | 5 | 48 | 105 | 35 | Mn1.5%—Al98.5% alloy |
| Example 87 | Nylon nonwoven fabric | 8.3 | 30 | 70 | 20 | 4N—Al |
| Example 88 | Polypropylene nonwoven fabric | 1.4 | 40 | 100 | 40 | Mg5%—Al95% alloy |
| Example 89 | Polypropylene nonwoven fabric | 5.2 | 40 | 100 | 40 | Pb0.05%—Al99.95% alloy |
| Example 90 | Polypropylene nonwoven fabric | 12 | 40 | 100 | 40 | Mg2%—Cr3.5%—Al94.5% alloy |
| Example 91 | Polypropylene nonwoven fabric | 2.5 | 10 | 100 | 40 | In0.05%—Mn5%—Al94.5% alloy |
| Example 92 | Polypropylene nonwoven fabric | 2.5 | 80 | 100 | 40 | Ca0.05%—Mn5%—Al94.5% alloy |
| Example 93 | Polypropylene nonwoven fabric | 2.5 | 120 | 100 | 40 | Sn0.05%—Mn5%—Al94.5% alloy |
| Example 94 | Polypropylene nonwoven fabric | 2.5 | 200 | 100 | 40 | 4N—Al |
| Example 95 | Polypropylene nonwoven fabric | 2.5 | 40 | 100 | 10 | 4N—Al |
| Example 96 | Polypropylene nonwoven fabric | 2.5 | 40 | 100 | 70 | 4N—Al |
| Example 97 | Polypropylene nonwoven fabric | 2.5 | 40 | 100 | 120 | 5% Zn—95% Al alloy |
| Example 98 | Polypropylene nonwoven fabric | 0.8 | 40 | 100 | 40 | 4N—Al |
| Example 99 | Polypropylene nonwoven fabric | 18 | 40 | 100 | 40 | 4N—Al |
| Example 100 | Polypropylene nonwoven fabric | 2.5 | 5 | 100 | 40 | 4N—Al |
| Example 101 | Polypropylene nonwoven fabric | 2.5 | 220 | 100 | 40 | 4N—Al |
| Example 102 | Polypropylene nonwoven fabric | 2.5 | 40 | 100 | 5 | 4N—Al |
| Example 103 | Polypropylene nonwoven fabric | 2.5 | 40 | 100 | 160 | 4N—Al |
| Comparative Example 21 | Hydrophilic cellulose porous film | 2.1 | 40 | 0 | 36 | 4N—Al |
| Comparative Example 22 | Hydrophilic polypropylene nonwoven fabric | 2.5 | 40 | 0 | 40 | 4N—Al |

TABLE 12

|  | Electromotive force (V) | Capacity (mAh) | Weight (g) | Number of leaks (in 100 cells) | Number of short-circuits (in 100 cells) |
|---|---|---|---|---|---|
| Example 80 | 1.87 | 1875 | 18 | 0 | 0 |
| Example 81 | 1.84 | 1870 | 18.2 | 0 | 0 |
| Example 82 | 1.86 | 1870 | 18 | 1 | 0 |
| Example 83 | 1.88 | 1865 | 18.1 | 0 | 0 |
| Example 84 | 1.87 | 1865 | 18.1 | 0 | 0 |
| Example 85 | 1.86 | 1865 | 18.2 | 2 | 0 |
| Example 86 | 1.87 | 1860 | 18 | 0 | 0 |
| Example 87 | 1.85 | 1865 | 18 | 0 | 0 |
| Example 88 | 1.86 | 1850 | 17.9 | 0 | 0 |

TABLE 12-continued

|  | Electromotive force (V) | Capacity (mAh) | Weight (g) | Number of leaks (in 100 cells) | Number of short-circuits (in 100 cells) |
|---|---|---|---|---|---|
| Example 89 | 1.86 | 1825 | 18.3 | 1 | 0 |
| Example 90 | 1.85 | 1800 | 18.2 | 0 | 0 |
| Example 91 | 1.86 | 1855 | 18 | 0 | 0 |
| Example 92 | 1.86 | 1850 | 18.4 | 1 | 0 |
| Example 93 | 1.87 | 1810 | 18.2 | 0 | 0 |
| Example 94 | 1.86 | 1790 | 18.1 | 0 | 0 |
| Example 95 | 1.87 | 1840 | 18.1 | 0 | 0 |
| Example 96 | 1.85 | 1820 | 18 | 1 | 0 |
| Example 97 | 1.87 | 1805 | 18.2 | 0 | 0 |
| Example 98 | 1.86 | 1850 | 18.1 | 1 | 5 |
| Example 99 | 1.87 | 980 | 18.3 | 0 | 0 |
| Example 100 | 1.85 | 1855 | 18 | 2 | 4 |
| Example 101 | 1.84 | 820 | 18.4 | 0 | 0 |
| Example 102 | 1.86 | 1845 | 17.9 | 1 | 8 |
| Example 103 | 1.86 | 1040 | 18.1 | 0 | 0 |
| Comparative Example 21 | 1.87 | 1860 | 18.2 | 70 | 0 |
| Comparative Example 22 | 1.86 | 1840 | 18.3 | 68 | 0 |

As clear from Table 11 and Table 12, the batteries of Examples 80 to 103 comprising hydrophobic separators are smaller in the number of leaks as compared with the batteries of Comparative examples 21 and 22 having hydrophilic separators.

Comparing the batteries of Examples 98 to 103, by reducing the thickness of the hydrophobic separator, lowering the air permeability or reducing the METSUKE, it is understood that possibility of short-circuiting is increased, or by increasing the thickness of the hydrophobic separator, heightening the air permeability or increasing the METSUKE, the discharge capacity is lowered.

EXAMPLE 104

An aluminum negative electrode battery of a manganese dry cell structure as shown in FIG. 11 was manufactured in the method explained below.

A positive electrode mixture was obtained by mixing 10 parts by weight of electrolytic manganese dioxide and 1 part by weight of acetylene black, and further adding 15 parts by weight of aqueous electrolyte. The electrolyte was prepared by using an aqueous solution containing 1.5 M/L of $AlCl_3$, 0.1 M/L of 2,2-bipyridyl, 0.2 M/L of $Al(NO_3)_3$, and 0.75 M/L of KCl.

A bag-shaped hydrophobic separator was prepared by using polypropylene nonwoven fabric having the air permeability, thickness, contact angle to water, and METSUKE as specified in Table 13. In this separator, the contact angle of the inner surface and the contact angle of the outer surface are equal to each other, and the contact angle shown in Table 13 refers to both contact angles of the inner and outer surfaces. The air permeability, thickness and contact angle were measured in the methods described above.

In a negative electrode can of 99.9% purity aluminum of cylindrical form with a bottom, a bag-shaped hydrophobic separator and bottom paper were set. The negative electrode can was filled with 9.5 g of the positive electrode mixture. The separator surface contacting with the inner surface of the negative electrode can is a first hydrophobic surface. On the other hand, the separator surface contacting with the outer circumferential surface of the positive electrode mixture is a second hydrophobic surface. Successively, a brim paper was arranged on the positive electrode mixture, and then a carbon positive electrode current collector rod was inserted. Further, after a wax layer was arranged on the brim paper, and an insulating washer made of polytetrafluoroethylene was placed in the negative electrode can, the negative electrode terminal and insulating washer were fixed to the negative electrode can by means of a heat shrink tube. Then, after an insulating ring was arranged, a positive electrode terminal was put on the current collector rod, and an aluminum negative electrode battery having the structure as shown in FIG. 11, and measuring 14 mm in diameter and 50 mm in overall height was assembled.

In the obtained battery, the electromotive force, and the battery capacity by discharging until a voltage of 0.65 V by constant current discharge at 100 mA were measured, and the electromotive force was 1.85 V and the capacity was 1070 mAh, and both high voltage and large capacity were obtained, while the weight was only 13.5 g.

EXAMPLES 105 TO 127 COMPARATIVE EXAMPLES 23 AND 24

Aluminum negative electrode batteries were fabricated in the same procedure as in Example 104, except that the material of the negative electrode active material, material of the separator, air permeability, thickness, contact angle, and METSUKE were set as shown in Table 13.

In the obtained batteries of Examples 104 to 127 and Comparative examples 23 and 24, the electromotive force, battery capacity, weight, number of leaking cells and number of short-circuited cells were measured in the same manner as in Example 80, and results as shown in Table 14 were obtained.

In Table 13, all aluminum alloys were prepared by using 4N-Al and additive elements.

TABLE 13

| | Separator material | Air Permeability (sec/100 mL) | Thickness (μm) | Contact angle (deg) | METSUKE (g/m2) | Negative electrode active material |
|---|---|---|---|---|---|---|
| Example 104 | Polypropylene nonwoven fabric | 4.8 | 150 | 100 | 42 | 4N—Al |
| Example 105 | Polyethylene nonwoven fabric | 2.4 | 140 | 94 | 50 | 5N—Al |
| Example 106 | Polystyrene porous film | 3.4 | 120 | 91 | 45 | 6N—Al |
| Example 107 | Acetyl cellulose porous film | 5 | 110 | 60 | 40 | 7N—Al |
| Example 108 | Ethyl cellulose porous film | 2.8 | 130 | 65 | 40 | Ca0.05%—Mn5%—Al94.5% alloy |
| Example 109 | Teflon coated kraft paper | 6.2 | 120 | 108 | 35 | Sn0.05%—Mn5%—Al94.5% alloy |
| Example 110 | Teflon coated glass fiber sheet | 7.5 | 110 | 105 | 35 | Mg5%—Al95% alloy |
| Example 111 | Nylon nonwoven fabric | 9.2 | 100 | 70 | 30 | Pb0.05%—Al99.05% alloy |
| Example 112 | Polypropylene nonwoven fabric | 1.4 | 150 | 100 | 42 | Mg2%—Cr3.5%—Al94.5% alloy |
| Example 113 | Polypropylene nonwoven fabric | 8.8 | 150 | 100 | 42 | In0.05%—Mn5%—Al94.5% alloy |
| Example 114 | Polypropylene nonwoven fabric | 12.4 | 150 | 100 | 42 | Ca0.05%—Mn5%—Al94.5% alloy |
| Example 115 | Polypropylene nonwoven fabric | 4.8 | 15 | 100 | 42 | Sn0.05%—Mn5%—Al94.5% alloy |
| Example 116 | Polypropylene nonwoven fabric | 4.8 | 40 | 100 | 42 | Mn1.5%—Al98.5% alloy |
| Example 117 | Polypropylene nonwoven fabric | 4.8 | 80 | 100 | 42 | Zn0.5%—Pb2%—Al97.5% alloy |
| Example 118 | Polypropylene nonwoven fabric | 4.8 | 190 | 100 | 42 | Pb0.05%—Al99.05% alloy |
| Example 119 | Polypropylene nonwoven fabric | 4.8 | 150 | 100 | 15 | Mg5%—Al95% alloy |
| Example 120 | Polypropylene nonwoven fabric | 4.8 | 150 | 100 | 65 | Mg2%—Cr3.5%—Al94.5% alloy |
| Example 121 | Polypropylene nonwoven fabric | 4.8 | 150 | 100 | 130 | In0.05%—Mn5%—Al94.5% alloy |
| Example 122 | Polypropylene nonwoven fabric | 0.8 | 150 | 100 | 42 | 4N—Al |
| Example 123 | Polypropylene nonwoven fabric | 16.3 | 150 | 100 | 42 | 4N—Al |
| Example 124 | Polypropylene nonwoven fabric | 4.8 | 8 | 100 | 42 | 4N—Al |
| Example 125 | Polypropylene nonwoven fabric | 4.8 | 220 | 100 | 42 | 4N—Al |
| Example 126 | Polypropylene nonwoven fabric | 4.8 | 150 | 100 | 8 | 4N—Al |
| Example 127 | Polypropylene nonwoven fabric | 4.8 | 150 | 100 | 160 | 4N—Al |
| Comparative Example 23 | Hydrophilic cellulose porous film | 5.6 | 150 | 0 | 48 | 4N—Al |
| Comparative Example 24 | Hydrophilic polypropylene nonwoven fabric | 5.1 | 150 | 0 | 43 | Mn1.5%—Al98.5% alloy |

TABLE 14

| | Electromotive force (V) | Capacity (mAh) | Weight (g) | Number of leaks (in 100 cells) | Number of short-circuits (in 100 cells) |
|---|---|---|---|---|---|
| Example 104 | 1.85 | 1070 | 13.5 | 0 | 0 |
| Example 105 | 1.86 | 1040 | 13.6 | 0 | 0 |
| Example 106 | 1.87 | 1055 | 13.5 | 0 | 0 |
| Example 107 | 1.86 | 1020 | 13.5 | 0 | 0 |
| Example 108 | 1.86 | 1000 | 13.7 | 1 | 0 |
| Example 109 | 1.85 | 1045 | 13.6 | 0 | 0 |
| Example 110 | 1.86 | 1020 | 13.5 | 0 | 0 |
| Example 111 | 1.85 | 1025 | 13.6 | 1 | 0 |
| Example 112 | 1.85 | 1010 | 13.8 | 0 | 0 |

TABLE 14-continued

|  | Electromotive force (V) | Capacity (mAh) | Weight (g) | Number of leaks (in 100 cells) | Number of short-circuits (in 100 cells) |
|---|---|---|---|---|---|
| Example 113 | 1.86 | 1005 | 13.6 | 0 | 0 |
| Example 114 | 1.87 | 1005 | 13.7 | 0 | 0 |
| Example 115 | 1.87 | 995 | 13.4 | 0 | 0 |
| Example 116 | 1.84 | 990 | 13.8 | 1 | 0 |
| Example 117 | 1.85 | 1020 | 13.6 | 2 | 0 |
| Example 118 | 1.84 | 1025 | 13.3 | 0 | 0 |
| Example 119 | 1.86 | 1035 | 13.7 | 0 | 0 |
| Example 120 | 1.84 | 1040 | 13.6 | 0 | 0 |
| Example 121 | 1.86 | 1045 | 13.5 | 0 | 0 |
| Example 122 | 1.87 | 1040 | 13.8 | 0 | 7 |
| Example 123 | 1.88 | 430 | 13.7 | 0 | 0 |
| Example 124 | 1.87 | 1000 | 13.7 | 0 | 5 |
| Example 125 | 1.87 | 400 | 13.6 | 0 | 0 |
| Example 126 | 1.87 | 1020 | 13.5 | 1 | 4 |
| Example 127 | 1.86 | 410 | 13.8 | 0 | 0 |
| Comparative Example 23 | 1.86 | 1005 | 13.5 | 45 | 0 |
| Comparative Example 24 | 1.85 | 1010 | 13.6 | 42 | 0 |

As clear from Table 13 and Table 14, the batteries of Examples 104 to 127 comprising hydrophobic separators are smaller in the number of leaks as compared with the batteries of Comparative examples 23 and 24 having hydrophilic separators.

Comparing the batteries of Examples 122 to 127, by reducing the thickness of the hydrophobic separator, lowering the air permeability or reducing the METSUKE, it is understood that possibility of short-circuiting is increased, or by increasing the thickness of the hydrophobic separator, heightening the air permeability or increasing the METSUKE, the discharge capacity is lowered.

EXAMPLE 128

An aluminum negative electrode battery of the same structure as in Example 51 was manufactured, except that the separator used in Example 80 was used instead of the glass fiber sheet.

EXAMPLE 129

An aluminum negative electrode battery of the same structure as in Example 51 was manufactured, except that the separator used in Example 86 was used instead of the glass fiber sheet.

In the obtained batteries of Examples 128 and 129, the battery capacity was measured in the same manner as in Example 51, and results as shown in Table 15 were obtained. At the same time, in 100 cells each of Examples 128 and 129, together with Example 51, by discharging up to 0.1 V, the number of leaking cells was measured and the results are also shown in Table 15. It was determined to be leak when weight difference before and after discharge was 0.1 g or more, and no leak if less than 0.1 g.

TABLE 15

|  | Separator | Water repellent polymer sheet | Capacity (mAh) | Number of leaks (in 100 cells) |
|---|---|---|---|---|
| Example 128 | Polypropylene nonwoven fabric (Example 80) | Same as in Example 51 | 2865 | 0 |
| Example 129 | Teflon coated glass fiber sheet (Example 86) | Same as in Example 51 | 2845 | 0 |
| Example 51 | Glass fiber sheet | Provided | 2870 | 5 |

As clear from Table 15, the batteries of Examples 128 and 129 comprising the hydrophobic separator and water repellent sheet permeating hydrogen gas are smaller in the number of leaks at deep discharge depth as compared with Example 51.

EXAMPLE 130

An aluminum negative electrode battery of the same structure as in Example 66 was manufactured, except that the separator used in Example 104 was used instead of the glass fiber sheet.

EXAMPLE 131

An aluminum negative electrode battery of the same structure as in Example 66 was manufactured, except that the separator used in Example 110 was used instead of the glass fiber sheet.

In the obtained batteries of Examples 130 and 131, the battery capacity was measured in the same manner as in Example 66, and results as shown in Table 16 were obtained. At the same time, in 100 cells each of Examples 130 and 131, together with Example 66, by discharging up to 0.1 V, the number of leaking cells was measured and the results are also shown in Table 16. It was determined to be leak when weight difference before and after discharge was 0.1 g or more, and no leak if less than 0.1 g.

TABLE 16

|  | Separator | Water repellent polymer sheet | Capacity (mAh) | Number of leaks (in 100 cells) |
|---|---|---|---|---|
| Example 130 | Polypropylene nonwoven fabric (Example 104) | Same as in Example 66 | 1370 | 0 |
| Example 131 | Teflon coated glass fiber sheet (Example 110) | Same as in Example 66 | 1365 | 0 |
| Example 66 | Glass fiber sheet | Provided | 1380 | 4 |

As clear from Table 16, the batteries of Examples 130 and 131 comprising the hydrophobic separator and water repellent sheet permeating hydrogen gas are smaller in the number of leaks at deep discharge depth as compared with Example 66.

The He gas permeability at 30° C. of the hydrogen gas permeable organic material used in the foregoing Examples, and the He gas permeability at 30° C. of the water repellent organic polymer sheet were measured by the method of JIS K 7126(1987) (Method of testing gas transmission rate through plastic film and sheet). The water repellence of the water repellent organic polymer sheet was measured by the method stated above.

As described herein, according to the invention, there can be provided an aluminum negative electrode battery enhanced in the discharge capacity. Also, according to the invention, there can be provided an aluminum negative electrode battery having the liquid leakage rate reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An aluminum negative electrode battery comprising:
an outer casing:
a power generating element case inserted in the outer casing;
a power generating element provided in the power generating element case and including a positive electrode mixture, a negative electrode gel and a separator provided between the positive electrode mixture and the negative electrode gel, the negative electrode gel containing an aqueous electrolyte and an active material containing at least one of aluminum and aluminum alloy;
a negative electrode gasket provided in an opening of the outer casing:
a negative electrode current collector rod inserted into the negative electrode gasket and the negative electrode gel;
a water repellent member which permeates hydrogen gas, and is provided between the negative electrode gasket and an inner wall of the opening of the power generating element case and faces at least one part of the negative electrode gel, the separator and the positive electrode mixture, the water repellent member being at least one hydrogen gas permeable sheet having a water repellence of 2 kPa or more and a He gas permeability in a range of $2 \times 10^{-6}$ to $10000 \times 10^{-6}$ ($cm^3$(STP)cm/sec·$cm^2$·cmHg) at 30° C.; and
an air chamber provided between the water repellent member and the power generating element and having a volume of 30% or less of an inner volume of the power generating element case.

2. The aluminum negative electrode battery according to claim 1, wherein the He gas permeability is in a range of $2 \times 10^{-6}$ to $1000 \times 10^{-6}$ ($cm^3$(STP)cm/sec·$cm^2$·cmHg).

3. The aluminum negative electrode battery according to claim 1, wherein the water repellence is 5.3 kPa or more.

4. The aluminum negative electrode battery according to claim 1, wherein said at least one hydrogen gas permeable sheet is formed of a material containing at least one resin selected from the group consisting of silicone rubber, polycarbonate, ethylene fluoride-propylene copolymer, natural rubber, butyl rubber, polybutadiene, ethyl cellulose, cellulose acetate, polystyrene, ethylene-vinyl acetate copolymer and polyethylene.

5. The aluminum negative electrode battery according to claim 1, wherein the water repellent member includes a laminate body comprising at least two hydrogen gas permeable sheets, and a gap between said at least two hydrogen gas permeable sheets is in a range of 1 to 5 mm.

6. The aluminum negative electrode battery according to claim 1, wherein a thickness of said at least one hydrogen gas permeable sheet is in a range of 0.1 to 3 mm.

7. The aluminum negative electrode battery according to claim 1, wherein the aqueous electrolyte contains an aqueous solution including halogen ion and at least one kind of ion of sulfate ion and nitrate ion.

8. The aluminum negative electrode battery according to claim 1, wherein the volume of the air chamber is 0.5 to 15% of the inner volume of the battery case.

9. The aluminum negative electrode battery according to claim 1, wherein the volume of the air chamber is 1 to 10% of the inner volume of the battery case.

10. The aluminum negative electrode battery according to claim 1, wherein the separator has a hydrophobic surface.

11. The aluminum negative electrode battery according to claim 1, wherein the power generating element case is formed of at least one conductive material selected from the group consisting of tungsten, molybdenum, lead, titanium nitride and carbonaceous material.

12. The aluminum negative electrode battery according to claim 1, wherein the negative electrode gasket is formed of a hydrogen gas permeable material having a He gas permeability in a range of $2 \times 10^{-10}$ ($cm^3$(STP)cm/sec·$cm^2$·cmHg) or more at 30° C.

13. An aluminum negative electrode battery comprising:
a negative electrode case formed of a material containing at least one of aluminum and aluminum alloy;
a power generating element which is provided in the negative electrode case, and includes a positive electrode mixture, an aqueous electrolyte and a separator provided between an inner surface of the negative electrode case and the positive electrode mixture;
an insulating washer provided in an opening of the negative electrode case;
a positive electrode current collector rod inserted in the insulating washer and the positive electrode mixture;
a water repellent member which permeates hydrogen gas, and is provided between an inner surface of the negative battery case and the positive electrode current collector rod, and faces the separator and the positive electrode mixture, the water repellent member being at least one hydrogen gas permeable sheet having a water repellent of 2 kPa or more and a He gas permeability in a range of $2\times10^{-6}$ to $10000\times10^{-6}$ (cm$^3$(STP)cm/sec·cm$^2$·cmHg) at 30° C.; and an air chamber provided between the water repellent member and the power generating element and having a volume of 30% or less of an inner volume of the negative electrode case.

14. The aluminum negative electrode battery according to claim 13, wherein the volume of the air chamber is 0.5 to 15% of the inner volume of the battery case.

15. The aluminum negative electrode battery according to claim 13, wherein the water repellent member includes a laminate body comprising at least two hydrogen gas permeable sheets, wherein a gap between said at least two hydrogen gas permeable sheets is in a range of 1 to 5 mm.

16. The aluminum negative electrode battery according to claim 13, wherein a thickness of said at least one hydrogen gas permeable sheet is in a range of 0.1 to 3 mm.

17. The aluminum negative electrode battery according to claim 13, wherein said at least one hydrogen gas permeable sheet is formed of a material containing at least one resin selected from the group consisting of silicone rubber, polycarbonate, ethylene fluoride-propylene copolymer, natural rubber, butyl rubber, polybutadiene, ethyl cellulose, cellulose acetate, polystyrene, ethylene-vinyl acetate copolymer and polyethylene.

18. The aluminum negative electrode battery according to 13, wherein the insulating washer is formed of a hydrogen gas permeable material having a He gas permeability in a range of $2\times10^{-10}$ (cm$^3$(STP)cm/sec·cm$^2$·cmHg) or more at 30° C.

* * * * *